United States Patent
Sury et al.

(10) Patent No.: US 9,740,617 B2
(45) Date of Patent: Aug. 22, 2017

(54) HARDWARE APPARATUSES AND METHODS TO CONTROL CACHE LINE COHERENCE

(71) Applicant: Intel Corporation, Santa Clara, CA (US)

(72) Inventors: Samantika Sury, Westford, MA (US); Simon Steely, Jr., Hudson, NH (US); William Hasenplaugh, Boston, MA (US); Joel Emer, Acton, MA (US); David Webb, Groton, MA (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 14/581,097

(22) Filed: Dec. 23, 2014

(65) Prior Publication Data

US 2016/0179674 A1  Jun. 23, 2016

(51) Int. Cl.
 *G06F 12/00* (2006.01)
 *G06F 12/0831* (2016.01)
 *G06F 12/0817* (2016.01)

(52) U.S. Cl.
 CPC ...... *G06F 12/0833* (2013.01); *G06F 12/0822* (2013.01); *G06F 2212/283* (2013.01); *Y02B 60/1225* (2013.01)

(58) Field of Classification Search
 CPC .. G06F 12/00; G06F 12/0828; G06F 12/0811; G06F 12/0886; G06F 12/0831; G06F 12/0817; G06F 12/0813; G06F 12/0815
 See application file for complete search history.

(56) References Cited

U.S. PATENT DOCUMENTS

| | | | |
|---|---|---|---|
| 6,633,960 B1 | 10/2003 | Kessler et al. | |
| 2007/0083716 A1* | 4/2007 | Rajamony | G06F 12/0831 711/141 |
| 2008/0086602 A1* | 4/2008 | Guthrie | G06F 12/0831 711/144 |
| 2008/0126750 A1* | 5/2008 | Sistla | G06F 12/0831 712/30 |

(Continued)

OTHER PUBLICATIONS

Krishna et al., "Towards the Ideal On-Chip Fabric for 1-to-Many and Many-to-1 Communication", Micro'11, Dec. 3-7, 2011, Port Alegre, Brazil, © 2011, ACM 978-1-4503-6/11/12 . . . $10.00, 12 pages.

(Continued)

*Primary Examiner* — Mano Padmanabhan
*Assistant Examiner* — Jean Edouard
(74) *Attorney, Agent, or Firm* — Nicholson De Vos Webster & Elliott, LLP

(57) ABSTRACT

Methods and apparatuses to control cache line coherence are described. A hardware processor may include a first processor core with a cache to store a cache line, a second set of processor cores that each include a cache to store a copy of the cache line, and cache coherence logic to aggregate in a tag directory an acknowledgment message from each of the second set of processor cores in response to a request from the first processor core to modify the copy of the cache line in each of the second set of processor cores and send a consolidated acknowledgment message to the first processor core.

24 Claims, 12 Drawing Sheets

(56) References Cited

U.S. PATENT DOCUMENTS

| | | | |
|---|---|---|---|
| 2008/0215824 A1* | 9/2008 | Goodman | G06F 12/0831 711/146 |
| 2010/0262778 A1* | 10/2010 | Cargnoni | G06F 12/0811 711/118 |
| 2010/0262786 A1* | 10/2010 | Cummings | G06F 12/0815 711/141 |
| 2012/0159077 A1* | 6/2012 | Steely, Jr. | G06F 12/0804 711/130 |
| 2012/0210071 A1* | 8/2012 | Black | G06F 15/167 711/130 |
| 2013/0297883 A1* | 11/2013 | Steely, Jr. | G06F 12/0891 711/133 |
| 2013/0326147 A1* | 12/2013 | Steely, Jr. | G06F 12/082 711/130 |
| 2016/0092354 A1 | 3/2016 | Steely et al. | |

OTHER PUBLICATIONS

Shubhendu S. Mykherjee et al., "The Alpha 21364 Network Architecture", 0272-1732/02/$17.00 © 2002 IEEE, 10 Pages.

Qing Yang, "Design of an Adaptive Cache Coherence Protocol for Large Scale Multiprocessors", IEEE Transactions on parallel and distributed systems, vol. 3, No. 8, May 1982, 13 pages.

Akhilesh Kumar, "Efficient and Scalable Cache Coherence Schemes for Shared Memory Hypercube Multiprocessors", Texas A&M University, College Station, TX 77843-3112, 1063-9535/94, $4 © 1994, IEEE, 10 pages.

Co-Pending U.S. Appl. No. 14/496,946, filed Sep. 26, 2014, Simon C. Steely et al.

* cited by examiner

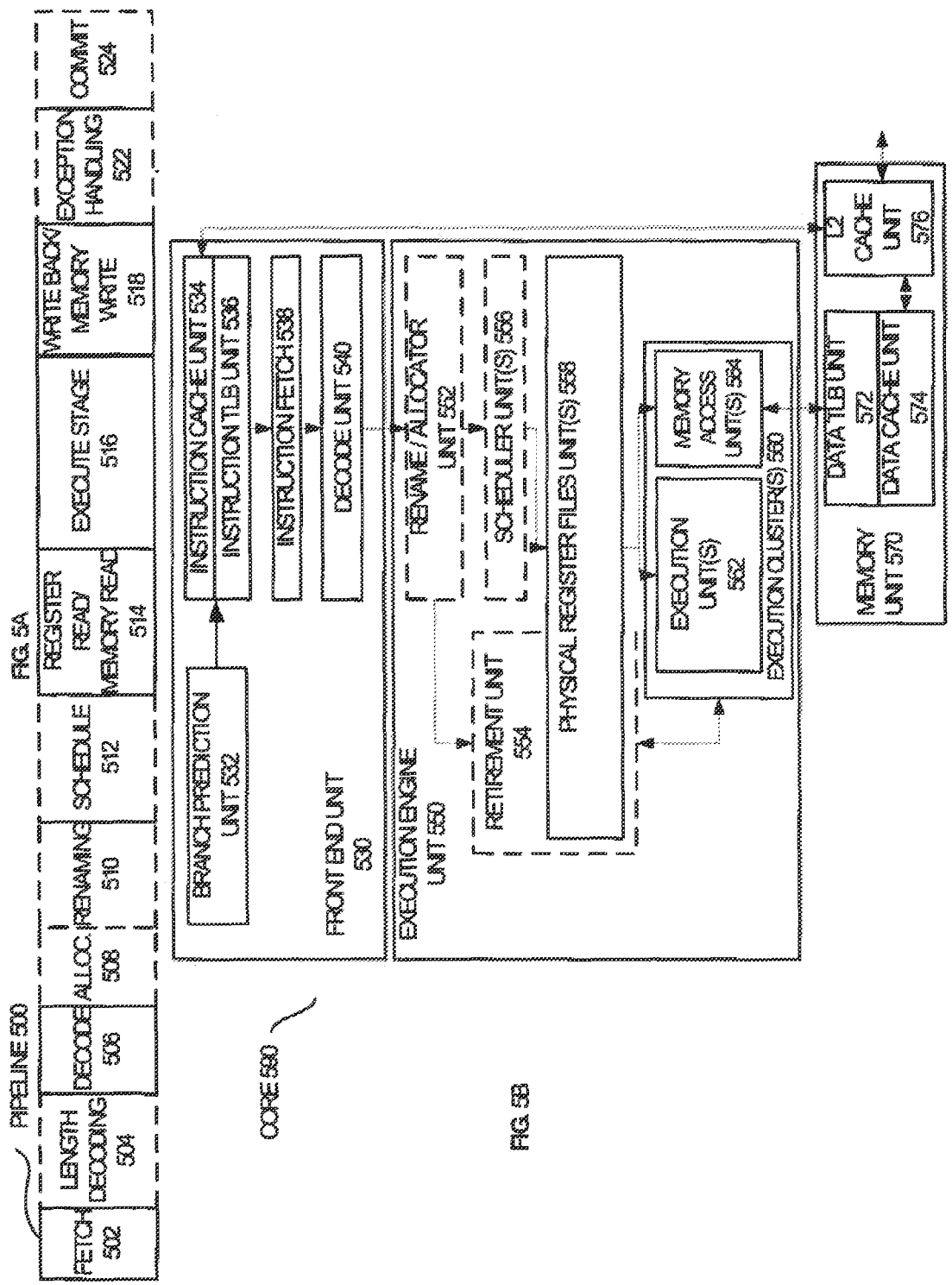

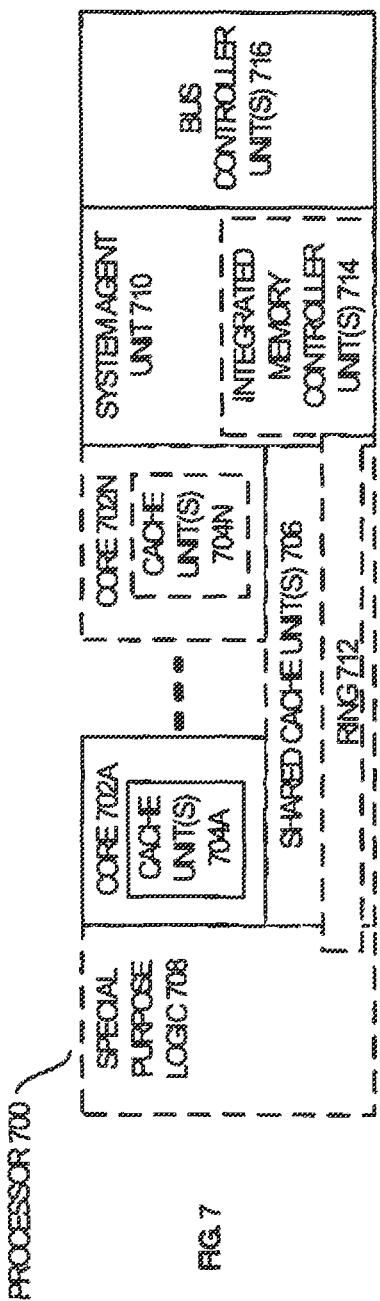

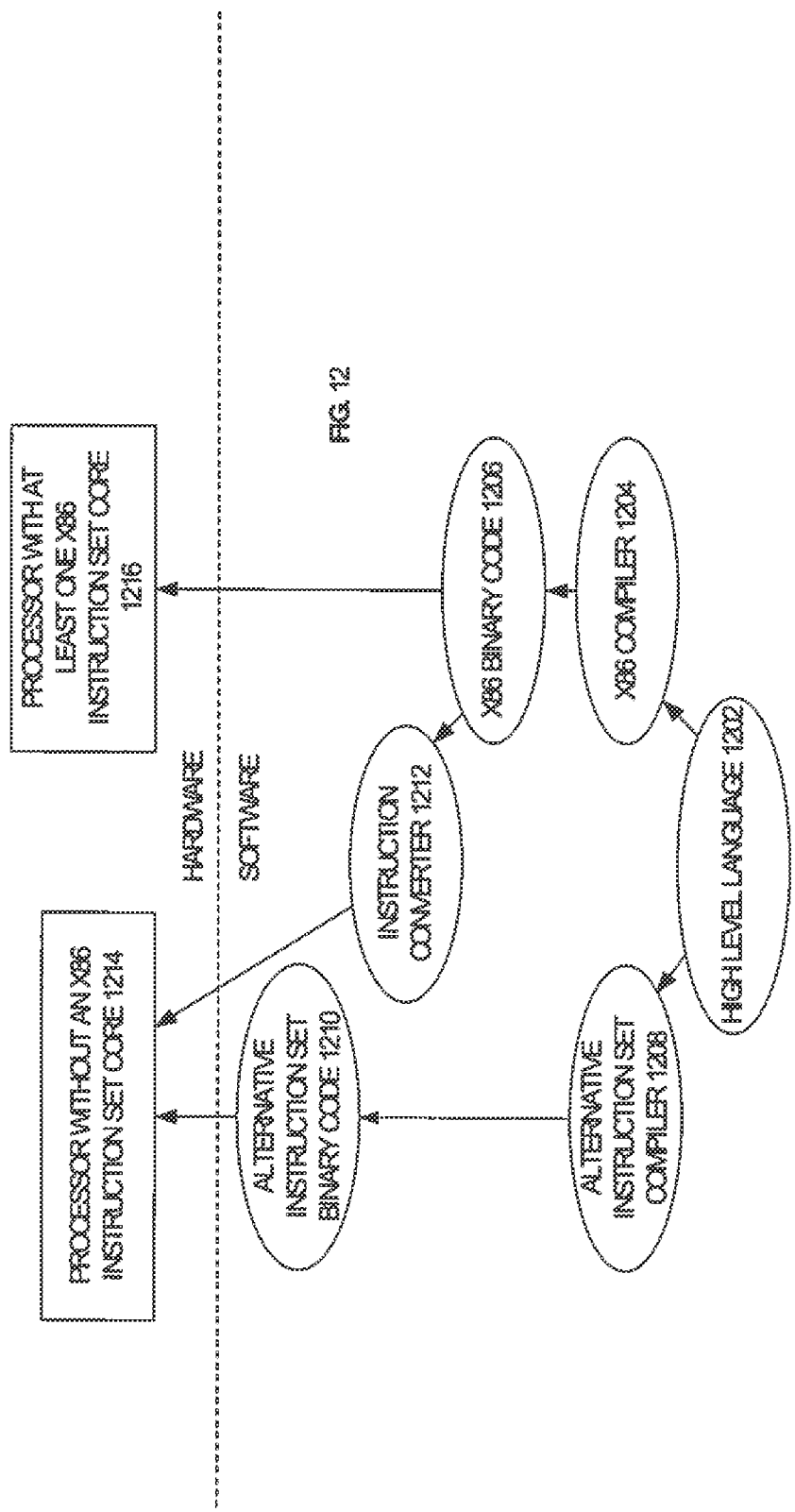

HARDWARE APPARATUSES AND METHODS TO CONTROL CACHE LINE COHERENCE

This invention was made with Government support under contract number H98230-11-3-0011 awarded by the Department of Defense. The Government has certain rights in this invention.

TECHNICAL FIELD

The disclosure relates generally to data requests, and, more specifically, an embodiment of the disclosure relates to controlling cache line coherence.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions. A processor, or set of processors, may each access data in the form of a cache line.

BRIEF DESCRIPTION OF THE DRAWINGS

The present disclosure is illustrated by way of example and not limitation in the figures of the accompanying drawings, in which like references indicate similar elements and in which:

FIG. 5A is a block diagram illustrating both an exemplary in-order pipeline and an exemplary register renaming, out-of-order issue/execution pipeline according to embodiments of the disclosure.

FIG. 5B is a block diagram illustrating both an exemplary embodiment of an in-order architecture core and an exemplary register renaming, out-of-order issue/execution architecture core to be included in a processor according to embodiments of the disclosure.

FIG. 7 is a block diagram of a processor that may have more than one core, may have an integrated memory controller, and may have integrated graphics according to embodiments of the disclosure.

FIG. 12 is a block diagram contrasting the use of a software instruction converter to convert binary instructions in a source instruction set to binary instructions in a target instruction set according to embodiments of the disclosure.

DETAILED DESCRIPTION

Figure 1:
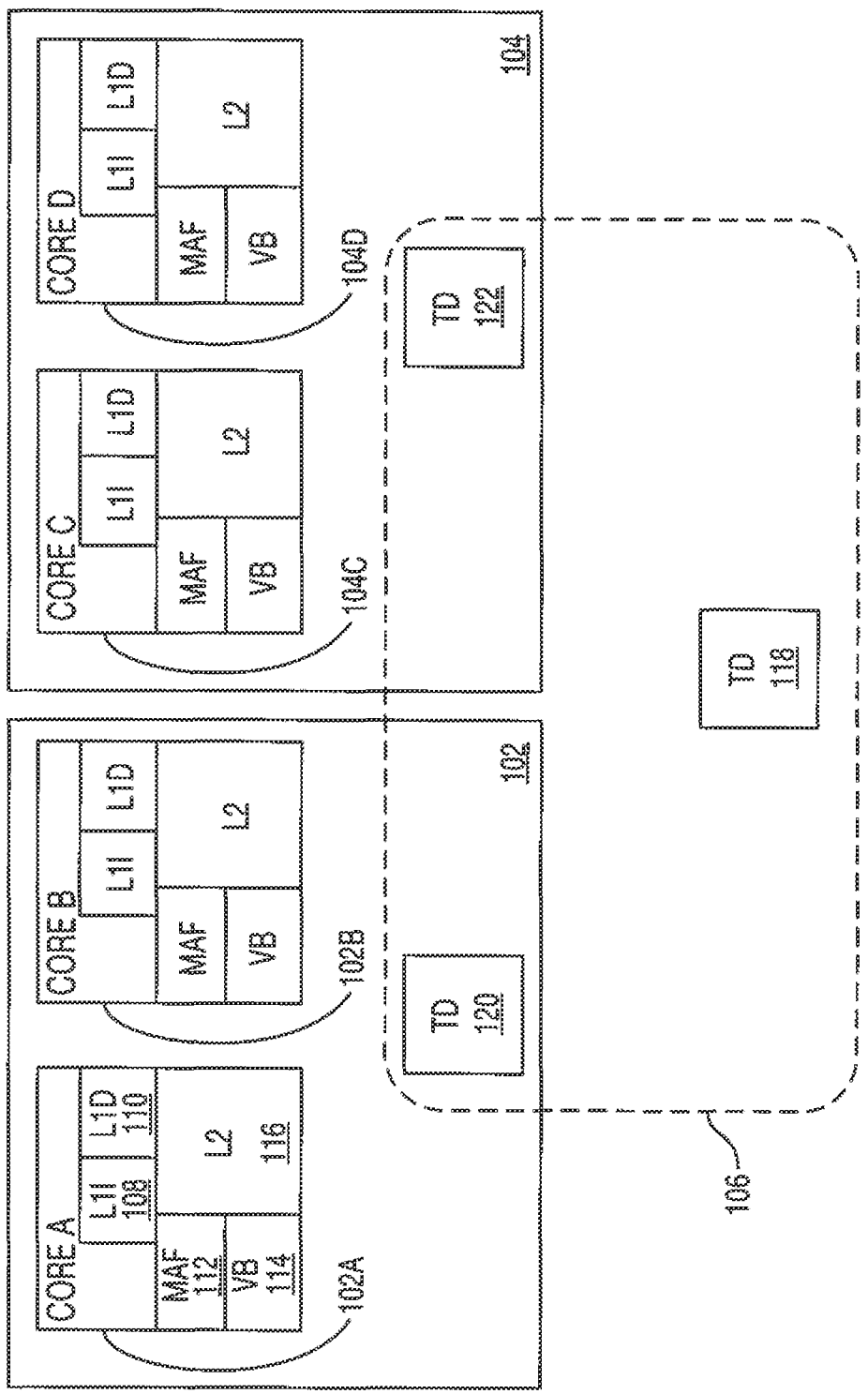
FIG. 1 illustrates an embodiment of multiple processor cores and tag directories in a cache coherency hierarchy.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A processor may operate on a cache line, e.g., in performing arithmetic or logic functions. A cache line may generally refer to a block (e.g., a sector) of memory (e.g., a cache) that may be managed as a unit for coherence purposes, for example, cache tags may be maintained on a per-line basis, e.g., in a tag directory. A cache line may be stored in cache memory (e.g., of any level, such as, but not limited to, L1, L2, L3, etc.), system memory, or combinations thereof. Cache memory may be shared by multiple cores of a processor or local (e.g., not shared) to each core of a processor. Cache memory (e.g., a cache) may generally refer to a memory buffer inserted between one or more processors and the bus, for example, to store (e.g., hold) currently active copies of cache lines, e.g., blocks from system (main) memory. Cache memory may be local to each processor or each processor core. Additionally or alternatively, cache memory may be shared by multiple processors or processor cores, e.g., separate from each processor or processor core. A cache line may refer to a 64 byte sized section of memory, e.g., 64 byte granularity. A tag directory entry may be different than the tag entries used in a cache. For example, a tag in the cache may describe the data (e.g., a cache line) at each cache entry. A tag directory may refer to a duplicate bookkeeping structure (e.g., occurring in the un-core) utilized by the cache line coherence logic (e.g., operations) to determine what data (e.g., what cache line) is in a cache without having to examine (e.g., access) the cache.

Cache line coherence (or coherency) may generally refer to each cache (e.g., cache memory) in the coherence domain observing all modifications of that same cache line, e.g., that each instance of that cache line contains the same data. For example, a modification may be said to be observed by a cache when any subsequent read would return the newly (e.g., current) written value.

In one embodiment, cache line coherence logic (e.g., as part of a hardware apparatus or method) may be used to manage and/or resolve conflicts resulting from a number of transactions, for example, a cache line look-up, cache line eviction, cache line fill, and snoop transactions. A snoop may generally refer to the action taken by a module on a transaction when it is not the master (e.g., owner) that originated the transaction or the repository of last resort for the data, but it still monitors the transaction. A cache (e.g., cache memory) and/or system memory may be snooped to maintain coherence during transactions to a cache line appearing in multiple locations in the cache.

In one embodiment, a cache line look-up may involve read and/or read-for-ownership transactions from the processor core(s) accessing the cache to read or gain ownership of a desired cache line. If the cache line look-up results in a miss in the cache (e.g., a cache local to a core), the request may be allocated to the external request queue, e.g., corresponding to an interface with other caches. If a cache line read request (e.g., not a read for ownership) results in a hit and the corresponding cache line is not exclusively owned by another core or processor, then the request may be completed and the cache line (e.g., data) returned to the requesting core. If a cache line read for ownership (RFO) request results in a hit and the corresponding cache line is not exclusively owned by another core or processor, then the cache coherence logic (e.g., protocol) may invalidate all other core's copies of the cache line before returning the acknowledgment of that invalidation to the requesting core (e.g., to indicate to the requesting core that it now has ownership of that cache line). Accesses to a particular core from a requesting agent (e.g., core) may be reduced by maintaining a tag (e.g., record) in a tag directory of whether another core has exclusive ownership, shared ownership, or no ownership of a requested line of the cache. The tag (e.g., tag entry) may be sets of bits in a tag directory (e.g., data structure) corresponding to the number of cores in a processor and/or processors. Each set of bits in a tag may indicate the type of ownership of the requested cache line, if any, for the core and/or processor to which it corresponds. However, the tag may be implemented in other ways without departing from the spirit of this disclosure.

A (e.g., centralized) tag directory may include entries to record the location and/or the status of respective cache lines as they exist throughout the system (e.g., in system memory, cache memory, or otherwise stored in a core and/or processor). For example, the tag directory may include an entry or entries to record which memory locations (e.g., core caches) have a copy of the cache line (e.g., data), and may further record if any of the memory locations have an updated copy of the cache line (e.g., data).

Directory-based coherency schemes may utilize a centralized tag directory to record the location and the status of cache lines as they exist throughout the system. For example, the tag directory may record which processor caches have a copy of the data, and further record if any of the caches have an updated copy of the data. When a processor makes a cache request (e.g., to the system memory) for a data item, the tag directory may be consulted to determine where the most recent copy of the data resides. Based on this information, the most recent copy of the cache line may be retrieved so that it may be provided to the requesting processor (e.g., the requesting processor's cache memory and/or the requesting core of the processor). The tag directory or directories may then be updated to reflect the new status for that cache line. Thus, each cache line read by a processor (e.g., a core thereof) may be accompanied by a tag directory update (e.g., a write).

In one embodiment, when a processor (e.g., a requesting core of a processor) makes a request for a cache line (e.g., data), for example, to a cache outside the processor (e.g., outside the requesting core of a processor), its (e.g., first level) tag directory may be consulted (e.g., via an interconnected network) to determine where the copies of the cache line (e.g., data) resides. In one embodiment, based on this information the most recent copy of the cache line may be retrieved so that it may be provided to the requesting processor (e.g., to the cache of the requesting processor). The tag directory may then be updated to reflect the new status for that cache line. In one embodiment, each cache line read by a processor may be accompanied by a tag directory update (e.g., a write). A tag directory based cache coherence scheme (e.g., logic) may include multiple tag directories, and the tag directories may be arranged in a hierarchy. For example, a hierarchical tag directory structure may include any number of levels. A tag directory may exist for each level of a cache, e.g., a tag directory one (TD1) for a first level of cache, a tag directory two (TD2) for a second level of cache, a tag directory three (TD3) for a third level of cache, etc. A tag directory may exist for a grouping of processor cores, e.g., a first level tag directory for a plurality (e.g., 8 to 16) of cores forming a domain and a second tag level directory for a plurality (e.g., 8 to 16) of first level domains, for example, each having a plurality of (e.g., 8 to 16) cores.

In one embodiment, requests for a missing cache line (e.g., not in the cache) may be handled by blocking (e.g., stalling) the request until the data arrives. Blocking (e.g., stalling) requests may not be a scalable approach and may not allow large numbers of processors (e.g., 32 or more processors) to be handled efficiently by the cache line coherence (e.g., logic hardware). In one embodiment, non-blocking (e.g., not blocking the processing of later request(s) for the same cache line) (e.g., scalable) cache line coherence may be utilized, for example, not stalling a later request(s) for the cache line while waiting for another memory (e.g., another cache and/or system memory) to supply the cache line missed (e.g., a cache line that was not present in the requested cache).

In certain embodiments of a non-blocking cache coherence (e.g., logic) managing the coherence (e.g., uniformity) of the caches of multiple cores, the handling of multicast messages (e.g., messages sent from a single source to several destination points) may be inefficient and lead to an increased energy consumption and contention in the communication resources utilized to send the messages (e.g., an interconnection network). A multicast message may refer to a message broadcast to a subset of the members of the network (e.g., not broadcast to every member of the network).

One such inefficiency that may arise is in the way the responses (e.g., of receipt of a request for an action and/or acknowledgment of completion of the action requested) for multicast messages are collected. An example of a multicast message is an invalidation which is used to obtain ownership of a cache line, e.g., a read for ownership (RFO) message from a requesting core. Ownership of a cache line may not be complete until it is known that all the other copies of the cache line are invalidated (e.g., removed from all of the caches), for example, by counting acknowledgements (e.g., acknowledgment messages) of successful (e.g., completed)

invalidations (e.g., commands to invalidate) referred to generally herein as inval-acks. Another such inefficiency may arise in an update-style protocol where a write-update to a cache line sends a message with the new data to all the (e.g., core) caches that have a copy of that cache line. These updated caches may then send an acknowledgement (update-ack) to the original updating (e.g., requesting) core to indicate that the updated caches have modified their data to be coherent with the updating core. With large core counts (e.g., 256 cores), these 255 acknowledgment messages (from every core other than the requesting core) might have to travel long distances to the requesting (e.g., invalidating or updating) core, for example, consuming energy and/or increasing the latency in the network. In one non-blocking cache coherence protocol, acknowledgements may be sent to the requesting core directly (e.g., not through a tag directory), for example, where the tag directory entry has moved on to processing the next request and cannot collect the acknowledgements. In one embodiment, an update protocol may include an update process with a first action to notify all copies of a cache line that an update is to happen. Each of those copies may stop (e.g., via cache coherence logic) all accesses to their cache line until the update arrives and may send an acknowledgment back to a central location (e.g., a tag directory) indicating they are ready to receive the update (e.g., acknowledging they are ready for a to-be-sent update). After all of those ready acknowledgements are returned, the update may be sent to all the copies of the cache line. In this way, no core may read an old value in parallel with some other core reading the updated value since all copies of the cache line are in a stop access state while (e.g., before) the cache lines are updated.

Yet another inefficiency may arise from the tag directory organization in a (e.g., large-scale) cache coherence protocol. For example, a hierarchical organization may introduce additional complexities in determining how many copies of the cache line exist at each level in the hierarchy. Since a tag directory organization may need to inform the requesting core exactly how many invalidation acknowledgments (inval-acks) or update acknowledgments (update-acks) to expect from the remaining cores (e.g., the cores that do not include the requesting core), the last level of a hierarchical organization may only have an approximate view of which cores had valid copies of data and may maintain a complicated partial credit mechanism. In one embodiment of the disclosure, aggregation in a tag directory may allow no credit counting for each core, e.g., may use acknowledgment counting per domain.

Certain embodiments of this disclosure may improve the performance of non-blocking cache coherence protocols. For example, certain embodiments may avoid individually sending all of the acknowledgements all the way to the requesting (e.g., invalidating or updating) core. For example, certain embodiments may allow the cache coherence protocol to determine how many acknowledgments the requesting core is to receive and/or when the acknowledgments arrive. Certain embodiments of this disclosure may include cache coherence (e.g., logic) to invalidate and/or update a plurality of copies of a cache line in a cache system that scales to 256 or more cores (e.g., 256 cores in each domain) and may minimize the energy used (e.g., minimize the messages sent).

In one embodiment, cache coherence (e.g., logic) aggregates at a tag directory itself the acknowledgment messages from the requested members (e.g., cores) of each domain that are to complete the requested process (e.g., invalidating and/or updating copies of a cache line therein) and sends a (e.g., one) consolidated acknowledgment message to the requesting member (e.g., requesting core). In certain embodiments, aggregating in a tag directory (e.g., in an entry thereof) the acknowledgment messages and sending only one consolidated message (e.g., that indicates receipt of the acknowledgment messages in that tag directory domain) to the requesting core may reduce the number of messages (e.g., that are to travel long distances) and/or reduce energy consumption and network traffic (e.g., contention) which may also reduce overall transaction latencies.

Cache coherence (e.g., logic) may be used with various requests that include an acknowledgment message by the recipient members (e.g., cores or caches), such as, but not limited to, a request from a first (e.g., requesting) processor core to update a copy (or copies) of a cache line in the cache of each of a second set of processor cores and/or a request from a first (e.g., requesting) processor core to invalidate the copy (or copies) of a cache line in the cache of each of a second set of processor cores and/or a request for ownership of a cache line to all caches. Below we discuss embodiments of the disclosure in reference to invalidation, but the disclosure is not so limited.

FIG. 1 illustrates an embodiment of multiple processor cores and tag directories in a cache coherency hierarchy. Cache(s) may be organized in any fashion, for example, as a physically or logically centralized or distributed cache. In one embodiment, a cache may include a physical centralized cache with a similarly centralized tag directory, such as higher level cache. Additionally or alternatively, a tag directory may be physically and/or logically distributed in a physically distributed cache.

In an embodiment, a processor, such as a processor or processors including the processor cores illustrated in the Figures, or any other processor, may include one or more caches. FIG. 1 illustrates an embodiment of first level cache coherency domains (102,104) with multiple cores (102A, 102B; 104C,104D, respectively). A processor may include at least one core and at least one un-core. In one embodiment, multiple cores (102A,102B; 104C,104D) may be a single processor. A core (e.g., 102A,102B, 104C,104D) may include components of the processor to execute instructions. An un-core (e.g., 106) may include all logic not in a core. A processor core (e.g., 102A) may include components such as a level 1 instruction cache (L1I) 108 and a level 1 data cache (L1D) 110. A core may include components such as a missing address file (MAF) 112, victim buffer (VB) 114, and a level 2 cache (L2) 116. An un-core may include the tag directories, for example, first level TD 120, first level TD 122, and second level TD 118, the control logic for those tag directories (not shown), and/or the interconnect (not shown) to pass messages (e.g., commands) and data between the cores (e.g., the caches thereof), the system memory, and/or the tag directories. One or more processors, one or more cores, and/or one or more un-cores and their caches may be associated with a domain. In an embodiment illustrated in FIG. 1, processor cores, un-cores, and caches, may be associated into a single domain (e.g., 102, 104). A second level tag directory (TD) 118 may represent data in the first level domains (e.g., 102, 104). For example, processors cores, un-cores, and caches, may each be associated into their own domain, e.g., two domains total. A respective tag directory (TD) (120, 122) may represent cache lines (e.g., data) in caches in each domain (102, 104) of processor cores, e.g., a first level (level 1) tag directory (TD1). A single tag directory (e.g., TD 118) may represent cache lines (e.g., data) in caches in multiple domains (e.g., first level domains 102 and 104). For example, the tag directory (TD) structure may be a hierarchy, where TD 120 and TD 122 are on one level of the hierarchy and TD 118 is on the next level. Although two levels in a tag directory (TD) hierarchy have been illustrated in FIG. 1, other embodiments may include any number of levels in a TD hierarchy.

For example, if a request for a cache line misses the L1D cache 110, the request may check for the same cache line in the L2 cache 116. If the cache line is not in the L2 cache 116, then the request may continue to check the first level TD 120 to find out whether the cache line is located in one of the caches in the domain represented by that TD 120 (e.g., a cache controlled by the other cores in the same domain, for example, the caches of core B). Even if a copy of the cache line is found in a neighboring cache in the same domain (e.g., 102), there may be other copies of the cache line in other domains (for example, in first level domain 104), which may be accounted for from a cache coherency perspective. Therefore, the request may need to continue to the second level TD 118, and check if any other domains also have a copy of the cache line. A tag directory or directories may be included as part of a cache line coherence (e.g., hardware) logic. Cache line coherency logic may include an on-die memory controller and/or off-die memory controller. The hardware apparatuses and methods discussed herein may be implemented with any cache at any cache level and/or any processor or processor level (e.g., core).

Figure 2:
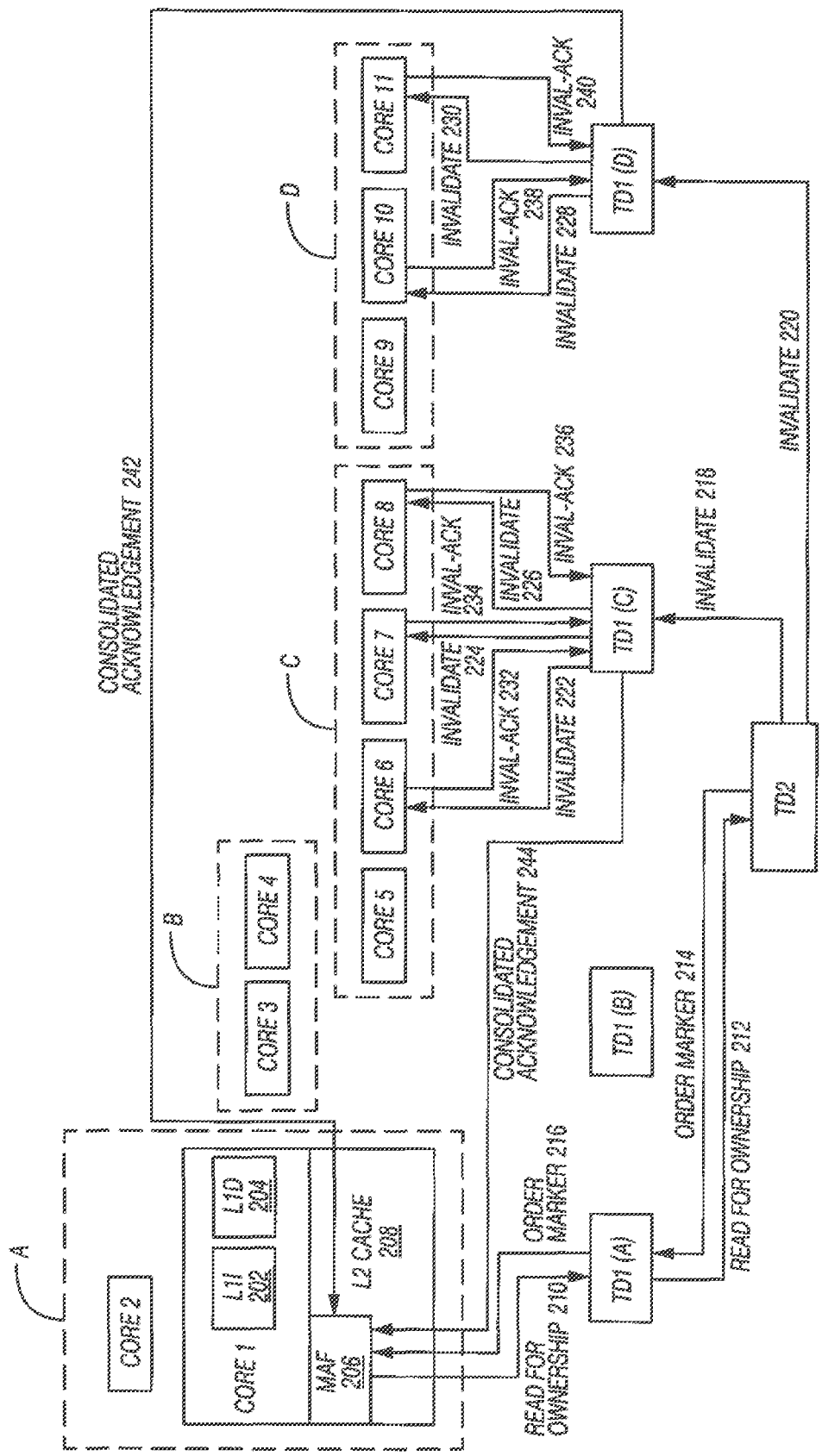
FIG. 2 illustrates an invalidate operation according to embodiments of the disclosure.

FIG. 2 illustrates an invalidate operation utilizing cache coherence (e.g., hardware logic) according to embodiments of the disclosure. FIG. 2 includes multiple processor cores (cores 1 through 11) and tag directory 1(A), i.e., TD1(A), through tag directory 1(D), i.e., TD1(D), and tag directory 2 (TD2) in a cache line coherence hierarchy according to embodiments of the disclosure. Cache(s) may be organized in any fashion, for example, as a physically or logically centralized or distributed cache. In one embodiment, a cache may include a physical centralized cache with a similarly centralized tag directory, such as a higher level cache. Additionally or alternatively, a tag directory may be physically and/or logically distributed in a physically distributed cache. FIG. 2 illustrates a two level (e.g., TD1 and TD2) tag directory hierarchy, however a single level or three or more levels may be utilized. In one embodiment, a processor, such as a processor(s) including the core(s) illustrated in the Figures, or any other processor, may include one or more caches. Cores in FIG. 2 may be part of a single hardware processor or distributed among multiple processors. Depicted core 1 includes a missing address file (MAF) (e.g., a table storing entries for missing addresses) 206, a level 2 cache (L2) 208 (e.g., a combined instruction and data cache), and a level one cache (including level 1 instruction cache (L1I) 202 and a level 1 data cache (L1D) 204). A core may include components of the processor to execute instructions. Although core 1 is shown with certain components, e.g., MAF, L2 cache, and L1 caches (202,204), any or none of these components may be present in any core. Any core or all cores (e.g., shown in detail for core 1) may include components such as a level one cache, e.g., level 1 instruction cache (L1I) 202 and/or a level 1 data cache (L1D) 204. A hardware processor (e.g., a core and/or uncore thereof) may include tag directories, for example, TD1(A), TD1(B), TD1(C), TD1(D), and/or TD2, the control logic for those tag directories (not shown), and/or the communication resources (e.g., interconnect, not shown) to pass messages (e.g., commands) and/or data between the cores (e.g., the caches thereof), the system memory, and/or the tag directories. One or more processors, one or more cores, and/or one or more un-cores and their caches may be associated with a domain.

A processor (e.g., processor cores, processor un-cores, and/or caches thereof) may be associated into a single domain. In an embodiment illustrated by reference to FIG. 2, core 1 may be in one domain of a first level tag directory, for example, such that tag directory TD1(A) includes entries (e.g., tags) to represent data in the caches of its domain A. Depicted domain A of first level tag directory A, that is, TD1(A), includes a plurality of cores (cores 1 and 2) with a (e.g., local) cache associated therewith that is a member of domain A. In one embodiment, a cache (not shown) may be shared by a plurality of cores (e.g., cores 1 and 2). In one embodiment, a level one (L1) and/or level two cache (L2) may be managed (e.g., for cache coherence) by a single, first level tag directory, for example, TD1(A). In one embodiment, a level one (L1) and/or level two cache (L2) may have (e.g., individual) tag directory entries (e.g., for cache coherence) in a single, first level tag directory, for example, TD1(A), TD1(B), TD1(C), or TD1(D). A domain may have a single core in certain embodiments. In an embodiment illustrated by reference to FIG. 2, there are 4 first level tag directories TD1(A), TD1(B), TD1(C), and TD1(D) for each respective first level domain with entries for the respective cores (e.g., caches) in that domain. In one embodiment, each cache is a member of only one first level domain, e.g., TD1(A), TD1(B), TD1(C), or TD1(D). Depicted domain B of first level tag directory D, that is, TD1(B), includes a plurality of cores (cores 3 and 4) with a (e.g., local) cache or caches associated therewith that are members of domain B. Depicted domain C of first level tag directory C, that is, TD1(C), includes a plurality of cores (cores 5, 6, 7, and 8) with a (e.g., local) cache or caches associated therewith that are members of domain C. Depicted domain D of first level tag directory D, that is, TD1(D), includes a plurality of cores (cores 9, 10, 11) with a (e.g., local) cache or caches associated therewith that are members of domain D. As depicted, cores (e.g., the caches of the cores) are members of a single, first level domain.

FIG. 2 also includes a second level tag directory (TD2), although a plurality of second level tag directories may be utilized according to different cache protocols. In one embodiment, second level directory TD2 has a domain that includes the first level tag directories TD1(A), TD1(B), TD1(C), and TD1(D), e.g., such that TD2 has a tag entry for each domain. In one embodiment, a second level tag directory has a tag entry (e.g., tag) for each first level domain that is a member of the second level domain. For example, a second level tag directory may include a tag directory entry indicating which of its first level domains include a copy of a cache line. In one embodiment, a second level tag directory includes a tag directory entry indicating which of its first level domains include a copy of a cache line but does not indicate which cores (e.g., caches) of that first level domain include the copy of the cache line.

Although two levels in a tag directory (TD) hierarchy have been illustrated in FIG. 2, other embodiments may include any number of levels in a TD hierarchy. For example, TD1(A) and TD1(B) may be members of a second level tag directory in one second level domain, e.g., TD2(A) (not depicted), and TD1(C) and TD1(D) may be members of a second level tag directory in another second level domain, e.g., TD2(B) (not depicted), such that second level tag directories (TD2(A) and TD2(B)) are members of a third level domain of a third level tag directory TD3 (not shown) with a tag entry for each second level domain.

As one example of cache coherence (e.g., logic), if core 1's request for a cache line misses the first level (L1) cache (e.g., L1D cache 204), the request may check for the same cache line in the L2 cache 208. In an embodiment where there is more than one core (e.g., core 2 in FIG. 2) in the same first level domain as core 1, if the cache line requested by core 1 is not in the (e.g., local) cache (e.g., L1 and L2 of core 1), then the request may check its first level tag directory (e.g., TD1(A)) to ascertain whether the cache line is located in one of the cores (e.g., caches) in the domain of that first level tag directory. For example, cache coherence logic may check TD1(A)) to ascertain if a cache controlled or associated with the other cores in the same domain includes the cache line, for example, the caches of core 2 in FIG. 1. Even if a copy of the cache line is found in a neighboring cache in the same (e.g., first level) domain, there may be other copies of the cache line in other domains (for example, in first level domains TD1(B). TD1(C), or TD1(D)), which may be accounted for from a cache coherence perspective, for example, to update and/or invalidate (e.g., delete) the other copies of the cache line. Therefore, in one embodiment, the request may continue to the second level domain (e.g., TD2) to check if any other (e.g., first level) domains also have a copy of the cache line. A tag directory or directories may be included as part of cache line coherence hardware (e.g., hardware logic circuit). Cache line coherence logic may include an on-die memory controller and/or off-die memory controller.

The sample configuration in FIGS. 1 and 2 are merely examples, and the number of cores (e.g., on a processor die) and the number of tag-directory (TD) levels may scale upward. For example, one configuration may be a node with 256 cores on the processor die, e.g., arranged in a two-dimensional mesh organization. Memory and external router (e.g., communication) ports may be located at the peripheries of the die.

A (e.g., requesting) core may have a missing address file (MAF) to list the core's request(s) for cache line(s) that miss (e.g., miss in the first level (L1) cache). A miss may cause cache coherence logic to send a message (e.g., to a tag directory) to locate other copies of the cache line. A processor (e.g., a core) may include a victim buffer (VB) (not depicted). A processor (e.g., each core) may include a victim buffer (VB) as a structure to hold a cache line evicted from its cache until the cache line (e.g., data) may be moved away (e.g., until the victim operation is complete). A MAF and/or VB may be utilized to support sending memory requests (e.g., a read for ownership (RFO) message, such as from a requesting core) across the socket to either memory or other core caches.

One embodiment of cache coherence logic including aggregation of acknowledgment messages in a tag directory and sending a consolidated acknowledgment message is depicted in FIG. 2. Although communication resources utilized to send the messages are not shown, any communication resources may be used, for example, an interconnected network, such as, but not limited to, a ring network. In one embodiment, a communication resource includes a probe channel. Core 1 is depicted as sending a request that is shown as a read for ownership (RFO) request (e.g., signal) 210 to invalidate all copies of the cache line, although any request may be utilized, such as, but not limited to, an update message to update all copies of a cache line. For example, by replacing the word invalidate (or inval) with the word update to indicate the according (e.g., logic) changes. Depicted core 1 includes MAF 206 sending the read for ownership (RFO) request 210, however in one embodiment, any component may send a message (e.g., read for ownership (RFO) message). In one embodiment, core 1 may have utilized a cache line and no longer needs to retain the cache line in the cache, so core 1 may request all other copies of that cache line are invalidated (e.g., in addition to invalidating core 1's local copies of the cache line, e.g., in L1 (202, 204) and L2 cache 208).

Read for ownership (RFO) request 210 from core 1 may then arrive at the tag directory for the (e.g., first level) domain TD1(A) that includes the cache(s) of core 1. Cache coherence logic may then check the entries in (e.g., first level) tag directory TD1(A) to determine if other tag directories have a copy of that cache line. In FIG. 2, a two level tag directory hierarchy is depicted and in certain embodiments, a first level tag directory (e.g., TD1(A)) may send a message to a second level tag directory to determine if any other first level tag directories include caches (e.g., of cores of the respective first level domains) that contain a copy of the cache line. In one embodiment, a read for ownership (RFO) message 210 may be sent directly to the second level tag directory (e.g., TD2), for example, not utilizing read for ownership (RFO) message 212 extending between the first level tag directory of the requesting core and the second level tag directory. In one embodiment, order marker (e.g., message) 214 may communicate directly with the requesting core (e.g., the MAF 206 thereof), for example, not utilizing order marker 216 extending between the second level tag directory and the first level tag directory of the requesting core.

In one embodiment (not depicted), a first level tag directory (e.g., TD1(A)) may include a tag directory entry indicating which, if any, other first level tag directories include caches (e.g., of cores of the respective first level domains) contain a copy of the cache line.

In the embodiment in FIG. 2, the requesting core's (e.g., core 1's) first level tag directory (e.g., TD1(A)) may send a request to invalidate message (e.g., read for ownership (RFO) message 212) to a second level tag directory, for example, to a second level tag directory of a second level domain that includes the first level tag directory including (e.g., an entry for) the cache of the requesting core. In one embodiment, the requesting core's (e.g., core 1's) first level tag directory (e.g., TD1(A)) may send a request to invalidate message, such as read for ownership (RFO) message 212 (e.g., to a second level tag directory), after determining that there are other first level domains that include a copy of the cache line, e.g., via a domain state field in the first level tag directory as discussed below.

Second level tag directory (e.g., TD2) may (e.g., upon receipt of read for ownership (RFO) request 212) send invalidate message(s) (e.g., commands to invalidate) to the other first level domains, if any, (e.g., within that second level domain) that include a copy of the to-be-invalidated cache line. As shown in FIG. 2, the higher (e.g., second) level tag directory (e.g., TD2) may include an entry or entries therein to indicate which, if any, of the lower (e.g., first) level domains (e.g., tag directories thereof) include a copy of the cache line. In one embodiment, the higher (e.g., second) level tag directory includes a tag directory entry indicating which of its first level domains include a copy of a cache line but does not indicate which cores (e.g., caches) of that first level domain include the copy of the cache line, e.g., as discussed below in reference to a domain valid vector. For example, second level tag directory TD2 may indicate here that first level domain C and first level domain D (e.g. not first level domain B) include at least one cache therein (e.g., of a core) that contains a copy of the (e.g., requested to be invalidated) cache line.

Cache line coherence logic may send (e.g., on receipt of a read for ownership (RFO) message from core 1 and/or its first level tag directory) an invalidate message to each first level domain that includes at least one cache therein (e.g., of a core) that contains a copy of the (e.g., requested to be invalidated) cache line. For example, read for ownership (RFO) message 212 may be sent to the second level tag directory TD2 from the first level tag directory TD1(A) of first level domain A of requesting core 1. An invalidate command (e.g., message) 218 may be sent from the second level tag directory TD2 to the first level tag directory TD1(C) of first level domain C. An invalidate command (e.g., message) 220 may be sent from the second level tag directory TD2 to the first level tag directory TD1(D) of first level domain D. In one embodiment, an invalidate message may be sent directly from the second level tag directory TD2 to the cores containing the cache line, e.g., when the entries of the second level tag directory include which cores of the first level domains include a copy of the cache line.

Cache line coherence logic may send invalidation requests from those first level domains to their caches (e.g., of cores) that include a copy of the cache line, for example, from all of the first level domains with caches (e.g., of cores thereof) that include a copy of the cache line but not from the requesting core's first level domain. For example, TD2 in FIG. 2 does not send an invalidate message to domain B (or its tag directory) as its cores (cores 3 and 4) do not have a copy of the cache line. For example, TD2 in FIG. 2 does not send an invalidate message to domain A (or its tag directory), for example, when domain A's caches (e.g., of cores 1 and 2) have already been managed for cache coherence (e.g., the request was fulfilled). In one embodiment, TD2 may send an invalidate message to domain A (or its tag directory), for example, in the form of or including a payload of an order marker, e.g., as discussed below.

Cache coherence logic may, on receipt of a request to invalidate from the requesting core (e.g., read for ownership (RFO) message 212) by the higher (e.g., second) level tag directory or directories (e.g., TD2), determine how many and/or which lower (e.g., first) level tag directories include at least one cache with a copy of the cache line. The number and/or identity of the lower level tag directories that include at least one cache with a copy of the cache line may be part of the order marker, e.g., as discussed below.

On receipt of the invalidate command (e.g., 218 or 220) at the first level tag directory (e.g., TD1(C) for domain C or TD1(D) for domain D), cache coherence logic (e.g., TD1(C) or TD1(D)) may determine how many and/or which caches (e.g., cores containing the caches) are to receive an invalidate message and may send those invalidate messages to those caches (e.g., or cores containing the caches). In one embodiment, cache coherence logic may broadcast an invalidate message to all cores in a domain or only the cores in that domain that have a copy of the cache line (e.g., as shown in FIG. 2 for first level domains C and D). In one embodiment, a first level tag directory includes an entry for each core (e.g., for a cache of that core) with a copy of a particular cache line.

In domain C in FIG. 2, cache coherency logic may determine (e.g., from TD1(C)) that cores 6, 7, and 8 and not core 5 include a copy of the to-be-invalidated cache line in their cache. Cache coherency logic may send (e.g., simultaneously) an invalidate message (222, 224, 226; respectively) to each of cores 6, 7, and 8. In domain D in FIG. 2, cache coherency logic may determine (e.g., from TD1(D)) that cores 10 and 11 and not core 9 (e.g., less than all of the cores in the domain) include a copy of the to-be-invalidated cache line in their cache. Cache coherency logic may send (e.g., simultaneously) an invalidate message (228, 230; respectively) to each of cores 10 and 11. Although invalidate messages are named similarly in FIG. 2, they are not required to be the same message format or include the same data in the message.

In certain embodiments, a message (e.g., an acknowledgment message to acknowledge completion of the request) may be included. Additionally or alternatively, a receipt message may be sent (e.g., to a requesting core) to indicate receipt by a cache (e.g., of a core) of the request (e.g., a request to invalidate). In one embodiment, cache coherence logic may request (e.g., require) an acknowledgment message to acknowledge completion (e.g., to the requestor) by the cache (e.g., of a core) of the request. In reference to FIG. 2, cache coherence logic may send an acknowledgment message (e.g., to TD1(C)) that cores 6, 7, and 8 in domain C invalidated the copy of the cache line in their cache. Cache coherency logic may send (e.g., simultaneously) an acknowledgment message (inval-ack) (232, 234, 236; respectively) from each of cores 6, 7, and 8. In reference to FIG. 2, cache coherence logic may send an acknowledgment message (e.g., to TD1(D)) that cores 10 and 11 in domain D invalidated the copy of the cache line in their cache. Cache coherency logic may send (e.g., simultaneously) an acknowledgment message (inval-ack) (238, 240; respectively) from each of cores 10 and 11. These acknowledgment messages may be sent using local communication resources, e.g., so that requesting core (e.g., core 1) does not receive them.

Cache coherence logic may send a consolidated acknowledgment message on receipt of all of the acknowledgment messages. Cache coherency logic (e.g., first level tag directories) may use a counter and/or comparator (e.g., to count a number of sent invalidate messages) and send a consolidated acknowledgment when all the acknowledgment messages are received (e.g., when all sent request messages have received an acknowledgment message) and/or use the core valid (CV) vector, e.g., as discussed below.

In certain embodiments, cache coherence logic aggregates (e.g., collects) in a tag directory an acknowledgment message from each core (e.g., cache thereof) with (e.g., having) a copy of the cache line requested to be modified by a requesting core (e.g., core 1 in FIG. 2). Cache coherence logic may send a consolidated acknowledgment message to the requesting core. In one embodiment, the number of consolidated acknowledgment messages is the number of (e.g., first level or second level) domains that contain at least one copy of the cache line to be modified.

In one embodiment, the aggregation occurs in the first level tag directory for each domain including a copy of the cache line, e.g., except for the first level domain of the requesting core. In one embodiment, once all of the invalidate acknowledgments are received for a (e.g., first level) domain, the cache coherence logic may send a consolidated acknowledgment messages (e.g., representing the completion of the requested action by all cores in that domain that included a copy of the cache line) to the requesting core (e.g., a requesting core's MAF).

In certain embodiments, the aggregation of acknowledgment messages to generate a consolidated acknowledgment message (e.g., the controlling and/or tracking of the messages received and/or sent) occurs all or in part in a tag directory (e.g., a tag directory entry placed in a temporary aggregation mode) and may allow a non-blocking approach by allowing a (e.g., regular) tag directory entry to be created for the same cache line (e.g., address) and continue with processing that cache line in a non-blocking manner while the aggregation of acknowledgment messages to generate a consolidated acknowledgment message is occurring.

In FIG. 2, the cache coherency logic aggregates (e.g., collects) in tag directory TD1(C) the invalidate acknowledgments (inval-acks) (232, 234, 236; respectively) from each of cores 6, 7, and 8 that included a copy of the cache line. In one embodiment, once all of the invalidate acknowledgments (232, 234, 236) are received for domain C, the cache coherence logic (e.g., tag directory TD1(C)) may send a consolidated acknowledgment (e.g., representing the receipt of acknowledgments from all cores in the C domain that included a copy of the cache line) to requesting core 1 (e.g., requesting core's MAF 206). In FIG. 2, the cache coherency logic aggregates (e.g., collects) in tag directory TD1(D) the invalidate acknowledgments (inval-acks) (238 and 240; respectively) from each of cores 10 and 11 that included a copy of the cache line. In one embodiment, once all of the invalidate acknowledgments (238 and 240) are received for domain D, the cache coherence logic (e.g., tag directory TD1(D)) may send a consolidated acknowledgment (e.g., representing the receipt of the acknowledgment from all cores in the D domain that included a copy of the cache line) to requesting core 1 (e.g., requesting core's MAF 206).

In an embodiment where the requesting core 1 is to receive the invalidation acknowledgments directly from the cores (not shown), requesting core 1 would receive at least five messages from cores 6, 7, 8, 10, and 11. However, using the consolidated acknowledgment and aggregation of this disclosure, requesting core 1 may only receive two consolidated acknowledgment messages, e.g., 244 from TD1(C) and 242 TD1(D), according to the example in FIG. 2.

In certain embodiments, the requesting core may have knowledge of the total number of consolidated acknowledgments that are to be received to determine that a request to modify a cache line is complete, e.g., all requested modifications of that cache line are completed in the cache managed by the cache coherence logic. A higher (e.g., second) level tag directory may have entries that indicate which of the lower (e.g., first) level domains have a copy of a cache line that is to-be-modified. For example, TD2 in FIG. 2 may have entries that indicate the domains (e.g., other than domain A of the requesting core) that have a copy of the cache line, that is, domains C and D in FIG. 2. Thus TD2 may send to the requesting core 1 (e.g., MAF 206 thereof) an order marker (e.g., 214,216) which may include the number and/or identity of the first level domains (TD1s) that have a copy of a cache line that is to-be-modified. In one embodiment, where the requesting core included a copy of the cache line, the total number of first level domains may include the requesting core's first level domain, however the cache coherency logic may determine, for example, by subtracting (e.g., the number one for) the requesting core's first level domain that includes a copy of the cache line from the total number of first level domains that included a copy of the to-be-modified (e.g., invalidated) cache line to determine the number of consolidated acknowledgments that are to be received at the requesting cache (e.g., core 1 or the domain A here). In one embodiment, order marker 214 may include the total number of domains (e.g., 3 first level domains of A, C, and D in FIG. 1) that included a copy of the to-be-modified (e.g., invalidated) cache line and the cache coherence logic (e.g., at TD1(A) or TD2) may determine that the lowest (e.g., first) requesting domain (e.g., first level domain A) includes a copy of that cache line and thus subtract (e.g., the number one for) the requesting core's first level domain that includes a copy of the cache line from the total number of first level domains (e.g., three total) that included a copy of the to-be-modified (e.g., invalidated) cache line to determine that the lowest requesting domain (e.g., first level domain A) is to receive two consolidated acknowledgments (242, 244). Cache coherence logic may sent an order marker 216 that indicates to the lowest requesting domain (domain A here) that two consolidated acknowledgments (242, 244) are to be sent for the two, non-requesting first level domains (C and D). In one embodiment, the requesting core (e.g., a MAF thereof) may receive the order marker (e.g., 216) directly from the second level domain (e.g., TD2). In one embodiment, the requesting core's first level domain (e.g., TD1(A)) may receive the order marker (e.g., 216) from the second level domain (e.g., TD2). The first level domain (e.g., TD1(A)) may forward the order marker (e.g., message 216) from the second level domain to the requesting core's domain (e.g., requesting core 1). Receipt of an order marker at TD1(A) may modify an entry therein (e.g., a domain state field), for example, to indicate that the copies of the cache line in the other first level domains are invalidated (or invalidation thereof has begun).

Order marker 214 may include a payload corresponding to the number of domains with a copy of the cache line (e.g., two here when the requesting core's copy of the cache line is not included in the number or three here where including the requesting core with a copy of the cache line in the number). The cache coherency logic may determine, for example, by subtracting one from the total number of first level domains that included a copy of the cache line to indicate to the requesting core that it is to receive two consolidated acknowledgments (e.g., 242,244), for example, to consider the requested modification completed on receipt of those two consolidated acknowledgment messages.

In another embodiment, order markers 214 and 216 may each include the total number of first level domains (e.g., three total in FIG. 2) that included a copy of the to-be-modified (e.g., invalidated) cache line. Cache coherence logic (e.g., at domain A and/or core 1) may determine how many consolidated acknowledgment messages (e.g., two messages, depicted as 242, 244) are to be received, for example, by subtracting the total number of first level domains (e.g., three total) that included a copy of the to-be-modified (e.g., invalidated) cache line and subtracting the requesting core's first level domain from that total number (e.g., based on the requesting core's first level domain having knowledge of the presence of the to-be-modified cache line) to determine the number of consolidated acknowledgment messages to receive. In one embodiment, an order marker may include information that indicates which (e.g., the identity) of the first level domains are to send consolidated acknowledgments.

In one embodiment, the requesting core 1 (e.g., a MAF) may determine when the requested process (e.g., an invalidation in FIG. 1) is completed, for example, by using a counter and/or comparator (e.g., to count a number of received consolidated acknowledgments and compare them to the number of expected consolidated acknowledgments). For example, cache coherence logic may (e.g., a counter and/or comparator) require two consolidated messages (e.g., as indicated by an order marker) and upon receipt of those two consolidated messages (e.g., 242, 244), may determine that the requested process is complete. In one embodiment, a completed invalidate process may indicate to the core wanting ownership (e.g., requesting core) that it may modify the cache line, for example, such that all copies of a cache line are kept coherent.

In one embodiment, cache coherence logic may utilize a different component than the MAF to receive an order marker and/or the consolidated acknowledgment messages, e.g., so as to acknowledge the completion of the requested modification.

Figure 3:
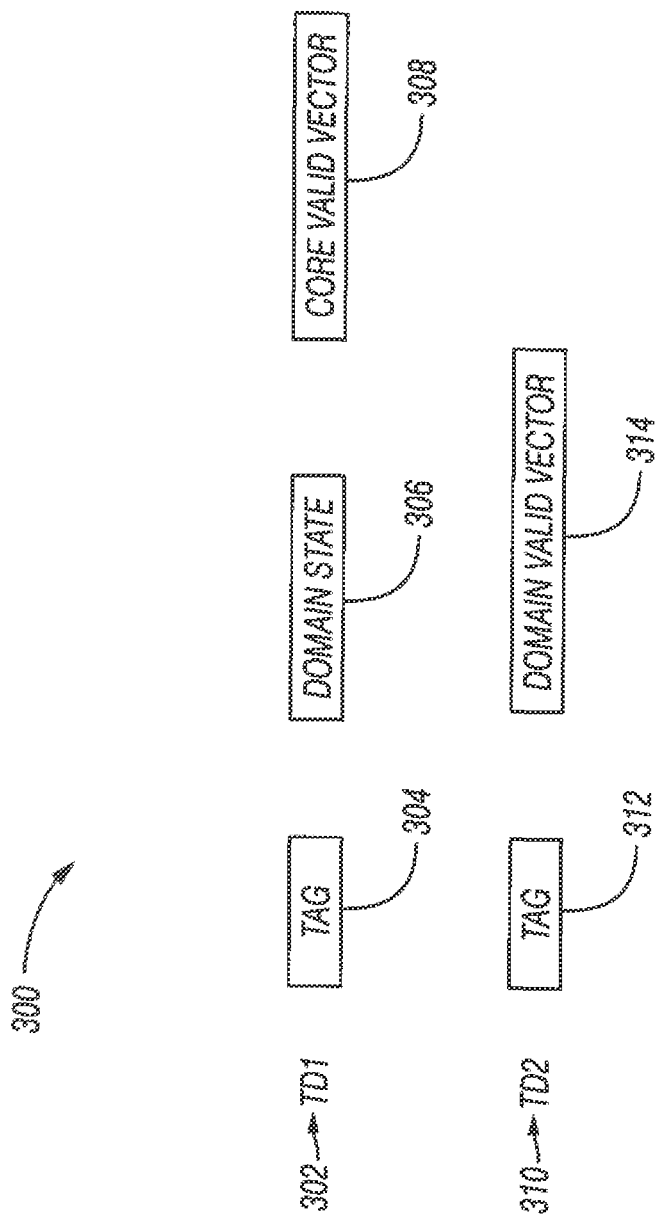
FIG. 3 illustrates tag directory entries according to embodiments of the disclosure.

FIG. 3 illustrates tag directory entries according to embodiments of the disclosure. First level tag directory 302 may include a tag entry 304 (e.g., including the address of a cache line that is present in the domain of that directory), a domain state entry 306, a core valid (CV) vector 308, or any combinations thereof. Second level tag directory 310 may include a tag entry 312 (e.g., including the domain identification of the first level domains that include a certain cache line), a domain valid (DV) vector 314, or any combinations thereof. Although the term vector is used above, it is not so required. The data in the tag directories may take any form. Each tag (e.g., a tag entry for each cache line) may include a domain state field, CV vector field, DC vector field, or any combination thereof. In certain embodiments, a tag directory entry may be used to aggregate the acknowledgment messages and/or to generate a consolidated acknowledgment message. For example, a cache line's tag directory entry may be used to control and/or track the messages received and/or sent for that cache line, and may allow the cache coherence protocol (e.g., logic) to remain non-blocking of requests for that cache line.

In one embodiment, a core valid (CV) vector may include different elements (e.g., one element) for each core (e.g., a cache thereof) of a domain. For example, cache coherence logic may set an element (e.g., a bit) in a CV vector to indicate that a particular cache line is present in certain cores of that domain. In reference to FIG. 1, TD1(C) may include a CV vector for a particular cache line (e.g., the cache line that is to-be-invalidated) having an element (e.g., bit) set (e.g., high) to indicate that core 5 does not have a copy of the cache line but cores 6, 7, and 8 do have a copy of the cache line. For example, an according CV vector may have the form of {0,1,1,1} where each value corresponds to cores 5, 6, 7, and 8 in that order to indicate the cores with a 1 have a copy of the to-be-modified cache line. CV vector of the (e.g., first level) tag directory may include an element for each processor core of the set of processor cores in that directory's domain to indicate which cores (e.g., caches thereof) include a copy of the cache line. Any level of directory may include a CV vector.

In one embodiment, a (e.g., higher domain) domain valid (DV) vector may include different elements (e.g., one element) for each (e.g., immediately) lower level domain (e.g., a cache thereof) that is a member of that higher level domain. For example, cache coherence logic may set (e.g. high) an element (e.g., a bit) in a DV vector to indicate that a particular cache line is present in certain lower (e.g., first) level domains of that higher (e.g., second) level domain. In reference to FIG. 1, TD2 may include a DV vector for a particular cache line (e.g., the cache line that is to-be-invalidated) having an element (e.g., bit) set (e.g., high) to indicate that domain B does not have a copy of the cache line but domains A, C, and D do have a copy of the cache line. For example, an according DV vector may have the form of {1,0,1,1} where each value corresponds to domains A, B, C, and D in that order to indicate the domains with a 1 have a copy of the to-be-modified cache line. DV vector of a higher (e.g., second) level tag directory may include an element for each lower (e.g., first) level tag directory to indicate which of the lower (e.g., first) tag directories (e.g., domains thereof) include a copy of the cache line. In one embodiment, each tag directory above the first level tag directory includes a domain vector for the domains that it is (e.g., immediately) above in a hierarchy.

In one embodiment, a domain state (e.g., field) may include one of 4 values. The first value, which may be denoted by E_LA, may indicate that the current domain (e.g., the domain in which the domain state field exists) has the only copies of the cache line in the cache (e.g., cache hierarchy). If one of the tag entries in a tag directory (e.g., TD1(A)) has a domain state value of E_LA, that domain state value may indicate that domain (e.g., domain A) has the only copies of the cache line associated with that domain state field. The second value, which may be denoted by S_LA, may indicate that the current domain is the last accessor of the cache line and at least one other domain has or had a copy of the cache line. If one of the tag entries in a tag directory (e.g., TD1(A)) has a domain state value of S_LA, that domain state value may indicate that domain (e.g., domain A) is the last accessor of the cache line associated with that domain state field, and at least one other domain (e.g., domains C and D) has a copy of the cache line. The third value, which may be denoted by S_NLA_S, may indicate that the current domain is not the last accessor of the cache line and all domains are up to date with the data for the cache line associated with that domain state field. If one of the tag entries in a tag directory (e.g., TD1(A)) has a domain state value of S_NLA_S, that domain state value may indicate that domain (e.g., domain A) is not the last accessor of the cache line associated with that domain state field, and all domains are up to date with the data for the cache line associated with that domain state field. The fourth value, which may be denoted by S_NLA_O, may indicate that the current domain is not the last accessor of the cache line and that the global last accessor domain has a copy that is not up to date with the current data. If one of the tag entries in a tag directory (e.g., TD1(A)) has a domain state value of S_NLA_O, that domain state value may indicate that domain (e.g., domain A) is not the last accessor of the cache line associated with that domain state field, and the global last accessor domain has a copy of the cache line that is not up to date.

In one embodiment, when a request to modify a cache line (e.g., commands to invalidate 218 and 220 as shown in FIG. 1, which may take the form of an invalidation packet) arrives at a (e.g., first level) tag directory, the invalidate acknowledgment aggregation process starts. For example, when an invalidate message (e.g., invalidates 218 or 220) arrives at a level one tag directory, the cache coherence logic may change the level one tag directory's (e.g., TD1(C) or TD1 (D)) domain state for the cache line to be invalidated to indicate the cache coherence logic (e.g., the first level tag directory) is in invalid aggregation (InvalAgg) mode. The cache coherence logic (e.g., the first level tag directory) may send invalidate messages (e.g., packets) (e.g., 222, 224, 226 for TD1(C)) to each of the cores (e.g., three cores 6, 7, and 8) with the cache line to-be-modified. Those cores may respond with invalidate acknowledgment messages (e.g., inval_ack packets) (e.g., 232, 234, 236 for TD1(C)) that return to the first level tag directory (e.g., TD1(C)) entry. When all acknowledgment messages (e.g., three acknowledgment messages 232, 234, 236 for TD1(C)) have arrived at the tag directory (e.g., TD1(C)), the CV vector for each of the cores may be cleared (e.g., no 1s) and a consolidated acknowledgement message (e.g., inval_ack packet) (e.g., 244) representing the entire domain may be sent to the original requestor core. In one embodiment, the sending of the consolidated acknowledgement message may change the level one tag directory's (e.g., TD1(C) or TD1(D)) domain state out of the aggregation mode. In one embodiment, the domain state in a tag for a cache line being set to invalid allows that entry in the tag directory to be reused.

In one embodiment, a first level tag directory waits for all of the cores thereof that includes a copy of the cache line to send their response (e.g., inval-ack) message before sending the consolidated acknowledgment message, e.g., in contrast to a first level tag directory waiting for a (e.g., arbitrary) length of time to send an (e.g., estimated) consolidated acknowledgment message. In one embodiment, cache coherence logic aggregation does not include a time dependent wait period.

In an embodiment without utilizing a second level tag directory (e.g., nor an associated second level domain), a first level tag directory may receive a request (e.g., from cache coherence logic) to invalidate the cores of its domain that include a copy of the cache line and the aggregation to generate a consolidated acknowledgment message may occur at that first level tag directory.

In one embodiment, a tag directory (e.g., a first level tag directory) may not use the aggregator mode, for example, if the request may be handled completely in the requesting core's domain. Certain embodiments herein may reduce the number of messages that have to travel across the die. For example, if all the acknowledgment messages are for cores in the requesting cores domain, the acknowledgment messages can be directly sent to the requesting core. For example, a requesting core (e.g., requesting member) can check caches in its domain before checking the other tag directories for a copy of the cache line.

In one embodiment, in a three-level TD hierarchy, cache coherence logic may aggregate also at level two (e.g., sending consolidated acknowledgment messages 242, 244 to TD2 instead of to the requesting core) to further consolidate those two consolidated acknowledgment messages 242, 244 into a single consolidated acknowledgment message (not shown) for multiple first level domains and sending that single consolidated acknowledgment message from TD2 (e.g., directly) to the requesting core.

In one embodiment, aggregation in a tag directory may reside at any level except the highest (e.g., last) level, e.g., when the tag directory at the highest (e.g., last) level is required to remember that the requesting core will have a valid copy after all the acknowledgements are received.

In one embodiment, an invalidation acknowledgement message (e.g., packet) includes one or more of the following items of information: the address of the cache line and/or domain that is being acknowledged, a credit or count that the requesting core and/or requesting domain can use to determine when it has received all acknowledgment messages and/or consolidated acknowledgment messages, and the identification of the acknowledging and/or requesting core so that a network can route messages. In certain embodiments, aggregation may remove the need for the requesting core to know exactly how many valid copies of data are present, for example, the cache coherence logic (e.g., requesting core) may only need to know how many domains have valid copies and each domain tag directory may be (e.g., independently) responsible to count the number of valid copies in its domain. In one embodiment, existing CV vectors may be utilized to represent the core acknowledgements yet to be received, e.g., cache coherence logic may not need a separate counter to count down acknowledgements. When a last CV bit in a CV vector is turned off, the consolidated acknowledgment message may be generated at the TD using the destination core ID, e.g., from the read for ownership (RFO) message (e.g., 210, 212) and/or invalidate command message (e.g., 218, or 220). In one embodiment, cache coherence logic aggregates the acknowledgment messages in the tag directory itself using the domain valid (e.g., presence bit) vector. This may eliminate the need for a separate counter to count the acknowledgment messages and may eliminate the need for any overflow mechanism.

In one embodiment, a tag directory covers the spectrum of all the addresses that are cached in the core caches and the tag directory may not run out of space to hold an aggregator entry as could be the case if the message aggregation were done in a separate structure, e.g., a table of finite entries.

In one embodiment, cache coherence logic does not include a (e.g., single) linked list of all copies of the cache line across all domains and send individual invalidate messages to each item in the linked list. In one embodiment, cache coherence logic aggregates at a tag directory (e.g., not aggregated at a network router).

Figure 4:
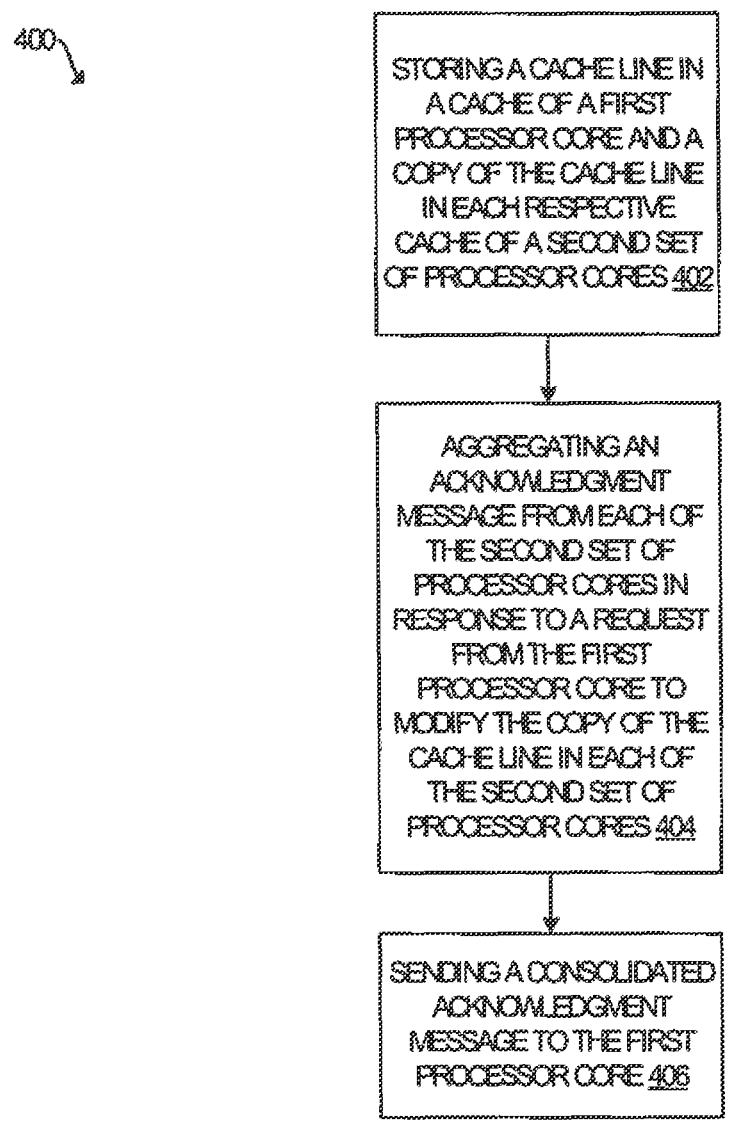
FIG. 4 illustrates a flow diagram of controlling cache line coherence according to embodiments of the disclosure.

FIG. 4 illustrates a flow diagram 400 of controlling cache line coherence according to embodiments of the disclosure. Flow diagram 400 includes storing a cache line in a cache of a first processor core and a copy of the cache line in each respective cache of a second set of processor cores 402, aggregating an acknowledgment message from each of the second set of processor cores in response to a request from the first processor core to modify the copy of the cache line in each of the second set of processor cores 404, and sending a consolidated acknowledgment message to the first processor core 406.

In one embodiment, a hardware apparatus includes a first processor core with a cache to store a cache line, a second set of processor cores that each include a cache to store a copy of the cache line, and cache coherence logic to aggregate in a tag directory an acknowledgment message from each of the second set of processor cores in response to a request from the first processor core to modify the copy of the cache line in each of the second set of processor cores and send a consolidated acknowledgment message to the first processor core. The request from the first processor core may update the copy of the cache line in the cache of each of the second set of processor cores. The request from the first processor core may invalidate the copy of the cache line in the cache of each of the second set of processor cores. The tag directory may include a first tag directory of a domain that includes the cache of the first processor core and a second tag directory of a domain that includes the caches of the second set of processor cores, wherein the cache coherence logic is to send the consolidated acknowledgment message from the second tag directory to the first processor core. A core valid vector of the second tag directory may include an element for each processor core of the second set of processor cores to indicate its cache includes the copy of the cache line. Receipt of the request from the first processor core by the second tag directory may set the second tag directory into an aggregator mode to allow the cache coherence logic to aggregate the acknowledgment message from each of the second set of processor cores and to send the consolidated acknowledgment message from the second tag directory to the first processor core. The hardware apparatus may further include a second level tag directory of a domain that includes at least the first tag directory and the second tag directory, wherein the first tag directory and the second tag directory are first level tag directories, a request from the first processor core to modify all copies of the cache line is to be sent to the second level tag directory, and the second level tag directory is to send the request to all first level tag directories with copies of the cache line. The hardware apparatus may further include a second level tag directory of a domain that includes at least the first tag directory and the second tag directory, wherein the first tag directory and the second tag directory are first level tag directories, a request from the first processor core to modify all copies of the cache line is to be sent to the second level tag directory, the second level tag directory is to send the request to all first level tag directories in its domain that have copies of the cache line except the first tag directory, and an order marker is to be sent from the second level tag directory to the first processor core to provide a number of first level tag directories that are to send consolidated acknowledgment messages to the first processor core.

In another embodiment, a method to control cache line coherence may include storing a cache line in a cache of a first processor core and a copy of the cache line in each respective cache of a second set of processor cores, aggregating in a tag directory an acknowledgment message from each of the second set of processor cores in response to a request from the first processor core to modify the copy of the cache line in each of the second set of processor cores, and sending (e.g., from the tag directory) a consolidated acknowledgment message to the first processor core. The request from the first processor core may update the copy of the cache line in the cache of each of the second set of processor cores. The request from the first processor core may invalidate the copy of the cache line in the cache of each of the second set of processor cores. The method may include providing a first tag directory of a domain that includes the cache of the first processor core and a second tag directory of a domain that includes the caches of the second set of processor cores, wherein the sending comprises sending the consolidated acknowledgment message from the second tag directory to the first processor core. The method may further include providing a core valid vector of the second tag directory that includes an element for each processor core of the second set of processor cores to indicate its cache includes the copy of the cache line. The method may include setting the second tag directory into an aggregator mode on receipt of the request from the first processor core by the second tag directory to initiate the aggregation, wherein the sending comprises sending the consolidated acknowledgment message from the second tag directory to the first processor core. The method may further include providing a second level tag directory of a domain that includes at least the first tag directory and the second tag directory, wherein the first tag directory and the second tag directory are first level tag directories, a request from the first processor core to modify all copies of the cache line is sent to the second level tag directory, and the second level tag directory sends the request to all first level tag directories with copies of the cache line. The method may further include providing a second level tag directory of a domain that includes at least the first tag directory and the second tag directory, wherein the first tag directory and the second tag directory are first level tag directories, a request from the first processor core to modify all copies of the cache line is sent to the second level tag directory, the second level tag directory sends the request to all first level tag directories in its domain that have copies of the cache line except the first tag directory, and an order marker is sent from the second level tag directory to the first processor core to provide a number of first level tag directories that are to send consolidated acknowledgment messages to the first processor core.

In yet another embodiment, an apparatus includes a set of one or more processors, and a set of one or more data storage devices that stores code, that when executed by the set of processors causes the set of one or more processors to perform the following: storing a cache line in a cache of a first processor core and a copy of the cache line in each respective cache of a second set of processor cores, aggregating in a tag directory an acknowledgment message from each of the second set of processor cores in response to a request from the first processor core to modify the copy of the cache line in each of the second set of processor cores, and sending (e.g., from the tag directory) a consolidated acknowledgment message to the first processor core. The set of data storage devices may further store code, that when executed by the set of processors causes the set of processors to perform the following: wherein the request from the first processor core updates the copy of the cache line in the cache of each of the second set of processor cores. The set of data storage devices may further store code, that when executed by the set of processors causes the set of processors to perform the following: wherein the request from the first processor core invalidates the copy of the cache line in the cache of each of the second set of processor cores. The set of data storage devices may further store code, that when executed by the set of processors causes the set of processors to perform the following: further comprising providing a first tag directory of a domain that includes the cache of the first processor core and a second tag directory of a domain that includes the caches of the second set of processor cores, wherein the sending comprises sending the consolidated acknowledgment message from the second tag directory to the first processor core. The set of data storage devices may further store code, that when executed by the set of processors causes the set of processors to perform the following: further comprising providing a core valid vector of the second tag directory that includes an element for each processor core of the second set of processor cores to indicate its cache includes the copy of the cache line. The set of data storage devices may further store code, that when executed by the set of processors causes the set of processors to perform the following: further comprising setting the second tag directory into an aggregator mode on receipt of the request from the first processor core by the second tag directory to initiate the aggregation, wherein the sending comprises sending the consolidated acknowledgment message from the second tag directory to the first processor core. The set of data storage devices may further store code, that when executed by the set of processors causes the set of processors to perform the following: further comprising a second level tag directory of a domain that includes at least the first tag directory and the second tag directory, wherein the first tag directory and the second tag directory are first level tag directories, a request from the first processor core to modify all copies of the cache line is sent to the second level tag directory, and the second level tag directory sends the request to all first level tag directories with copies of the cache line. The set of data storage devices may further store code, that when executed by the set of processors causes the set of processors to perform the following: further comprising a second level tag directory of a domain that includes at least the first tag directory and the second tag directory, wherein the first tag directory and the second tag directory are first level tag directories, a request from the first processor core to modify all copies of the cache line is sent to the second level tag directory, the second level tag directory sends the request to all first level tag directories in its domain that have copies of the cache line except the first tag directory, and an order marker is sent from the second level tag directory to the first processor core to provide a number of first level tag directories that are to send consolidated acknowledgment messages to the first processor core.

In another embodiment, a hardware apparatus includes a first processor core including a cache to store a cache line, a second set of processor cores that each include a cache to store a copy of the cache line, and means to aggregate in a tag directory an acknowledgment message from each of the second set of processor cores in response to a request from the first processor core to modify the copy of the cache line in each of the second set of processor cores and send (e.g., from the tag directory) a consolidated acknowledgment message to the first processor core.

In another embodiment, a machine readable storage medium includes code, when executed, to cause a machine to perform any of the methods disclosed herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 5A is a block diagram illustrating both an exemplary in-order pipeline and an exemplary register renaming, out-of-order issue/execution pipeline according to embodiments of the disclosure. FIG. 5B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 5A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524.

FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit, a write mask registers unit, and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s)

556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-threading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 6B:
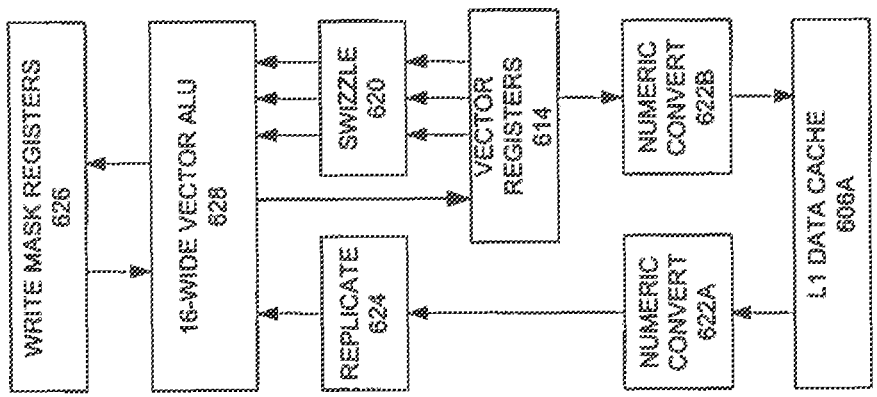
FIG. 6B is an expanded view of part of the processor core in FIG. 6A according to embodiments of the disclosure.
Figure 6A:
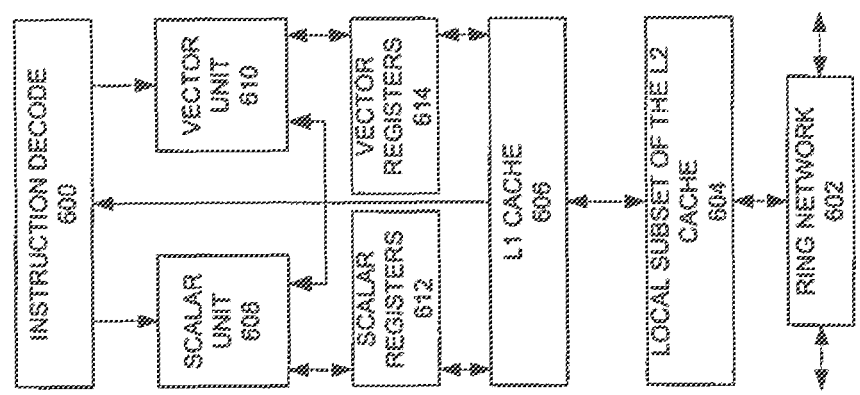
FIG. 6A is a block diagram of a single processor core, along with its connection to the on-die interconnect network and with its local subset of the Level 2 (L2) cache, according to embodiments of the disclosure.

FIGS. 6A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 6A is a block diagram of a single processor core, along with its connection to the on-die interconnect network 602 and with its local subset of the Level 2 (L2) cache 604, according to embodiments of the disclosure. In one embodiment, an instruction decoder 600 supports the x86 instruction set with a packed data instruction set extension. An L1 cache 606 allows low-latency accesses to cache memory into the scalar and vector units. While in one embodiment (to simplify the design), a scalar unit 608 and a vector unit 610 use separate register sets (respectively, scalar registers 612 and vector registers 614) and data transferred between them is written to memory and then read back in from a level 1 (L1) cache 606, alternative embodiments of the disclosure may use a different approach (e.g., use a single register set or include a communication path that allow data to be transferred between the two register files without being written and read back).

The local subset of the L2 cache 604 is part of a global L2 cache that is divided into separate local subsets, one per processor core. Each processor core has a direct access path to its own local subset of the L2 cache 604. Data read by a processor core is stored in its L2 cache subset 604 and can be accessed quickly, in parallel with other processor cores accessing their own local L2 cache subsets. Data written by a processor core is stored in its own L2 cache subset 604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 6B is an expanded view of part of the processor core in FIG. 6A according to embodiments of the disclosure. FIG. 6B includes an L1 data cache 606A part of the L1 cache 604, as well as more detail regarding the vector unit 610 and the vector registers 614. Specifically, the vector unit 610 is a 16-wide vector processing unit (VPU) (see the 16-wide ALU 628), which executes one or more of integer, single-precision float, and double-precision float instructions. The VPU supports swizzling the register inputs with swizzle unit 620, numeric conversion with numeric convert units 622A-B, and replication with replication unit 624 on the memory input. Write mask registers 626 allow predicating resulting vector writes.

Processor with Integrated Memory Controller and Graphics

FIG. 7 is a block diagram of a processor 700 that may have more than one core, may have an integrated memory controller, and may have integrated graphics according to embodiments of the disclosure. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof. While in one embodiment a ring based interconnect unit 712 interconnects the integrated graphics logic 708, the set of shared cache units 706, and the system agent unit 710/integrated memory controller unit(s) 714, alternative embodiments may use any number of well-known techniques for interconnecting such units. In one embodiment, coherency is maintained between one or more cache units 706 and cores 702-A-N, e.g., by cache line coherence logic.

In some embodiments, one or more of the cores 702A-N are capable of multithreading. The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set.

Exemplary Computer Architectures

FIGS. 8-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
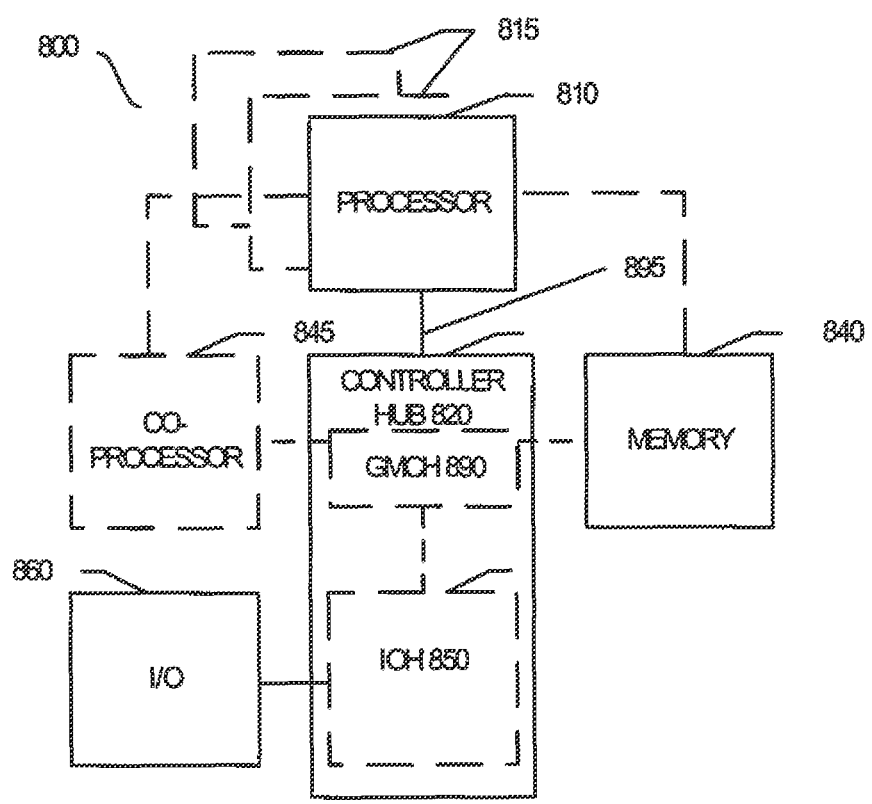
FIG. 8 is a block diagram of a system in accordance with one embodiment of the present disclosure.

Referring now to FIG. 8, shown is a block diagram of a system 800 in accordance with one embodiment of the present disclosure. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 700.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
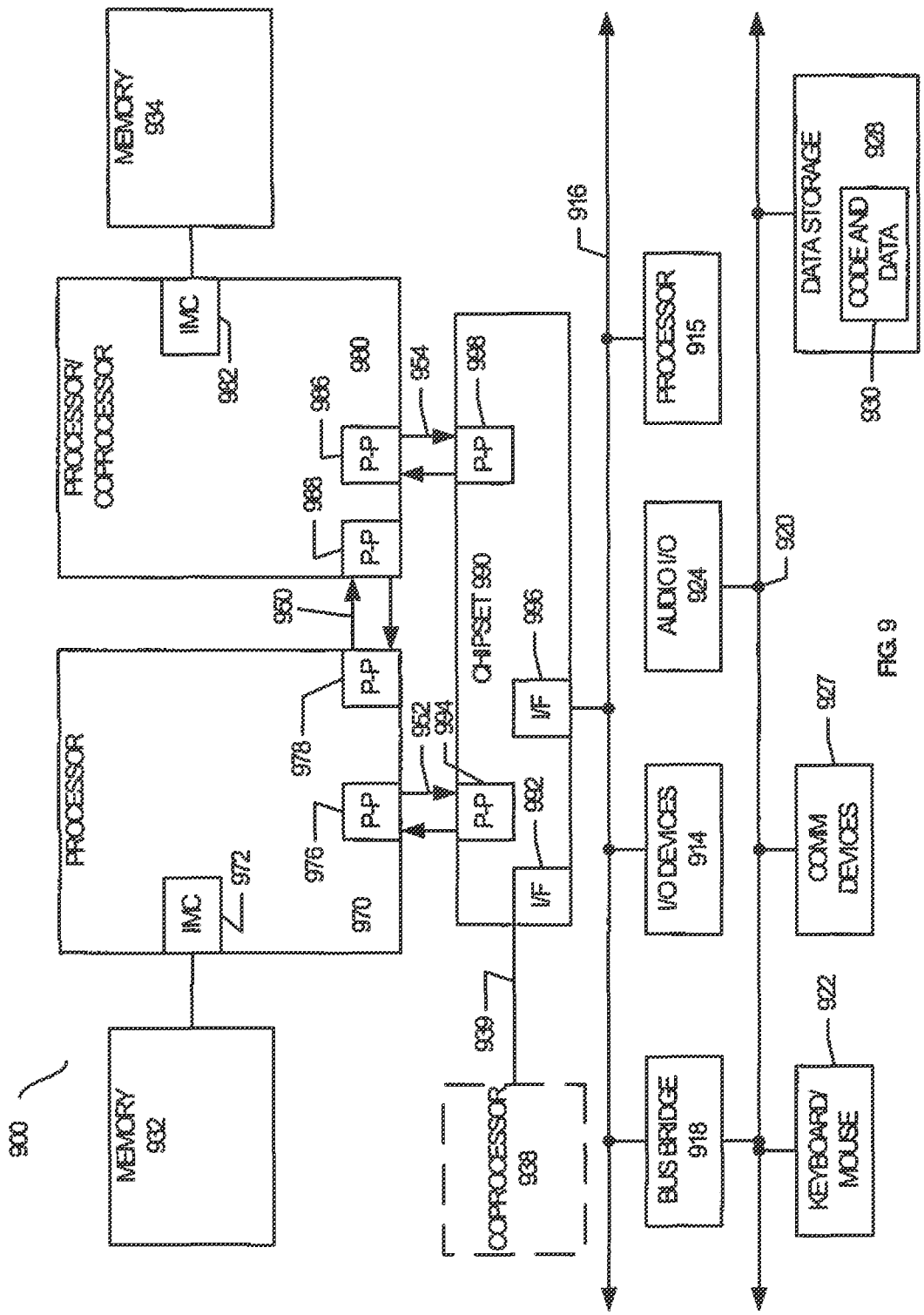
FIG. 9 is a block diagram of a more specific exemplary system in accordance with an embodiment of the present disclosure.

Referring now to FIG. 9, shown is a block diagram of a first more specific exemplary system 900 in accordance with an embodiment of the present disclosure. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 700. In one embodiment of the disclosure, processors 970 and 980 are respectively processors 810 and 815, while coprocessor 938 is coprocessor 845. In another embodiment, processors 970 and 980 are respectively processor 810 coprocessor 845.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present disclosure is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
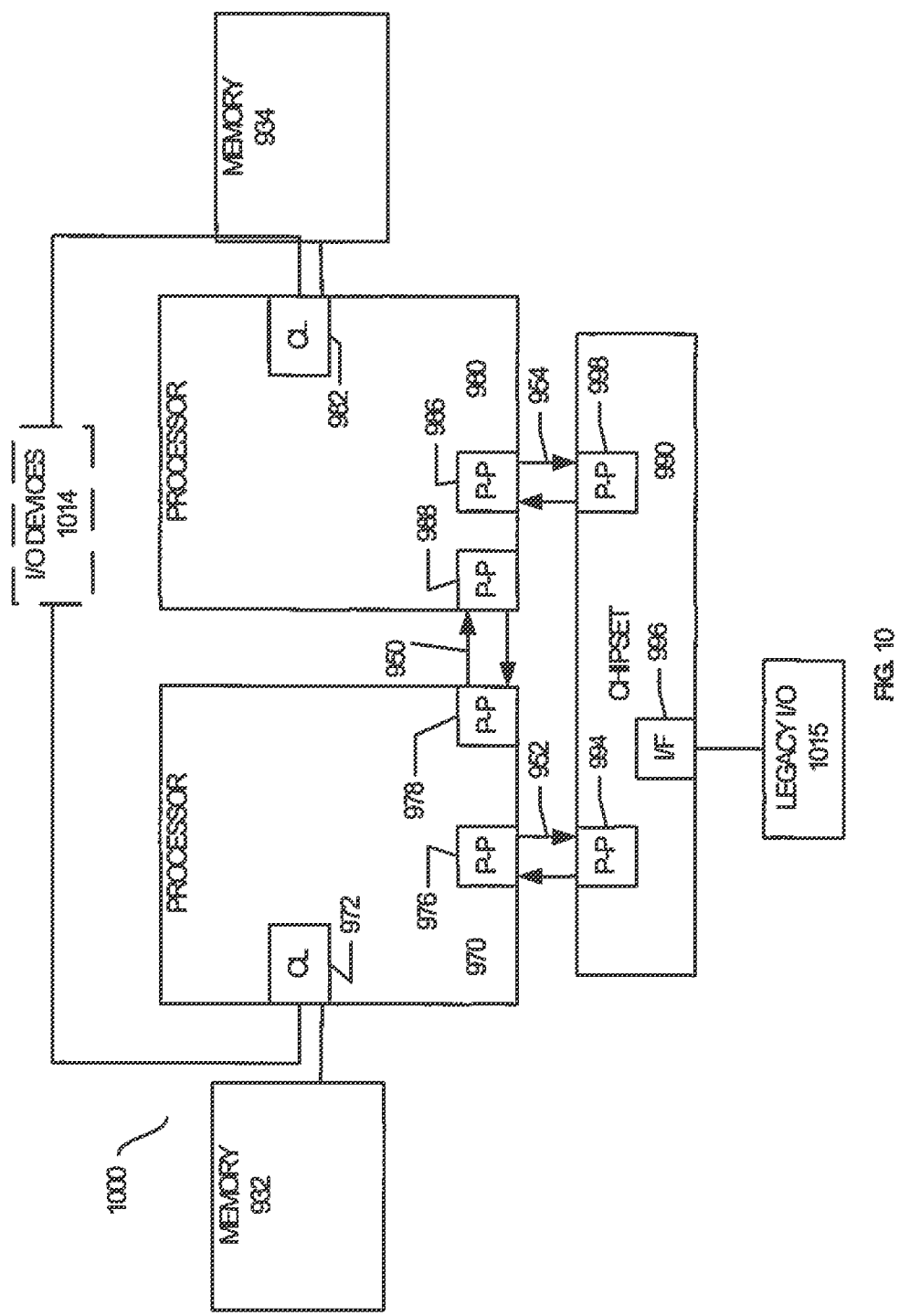
FIG. 10, shown is a block diagram of a second more specific exemplary system in accordance with an embodiment of the present disclosure.

Referring now to FIG. 10, shown is a block diagram of a second more specific exemplary system 1000 in accordance with an embodiment of the present disclosure. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processors 970, 980 may include integrated memory and I/O control logic ("CL") 972 and 982, respectively. Thus, the CL 972, 982 include integrated memory controller units and include I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chipset 990.

Figure 11:
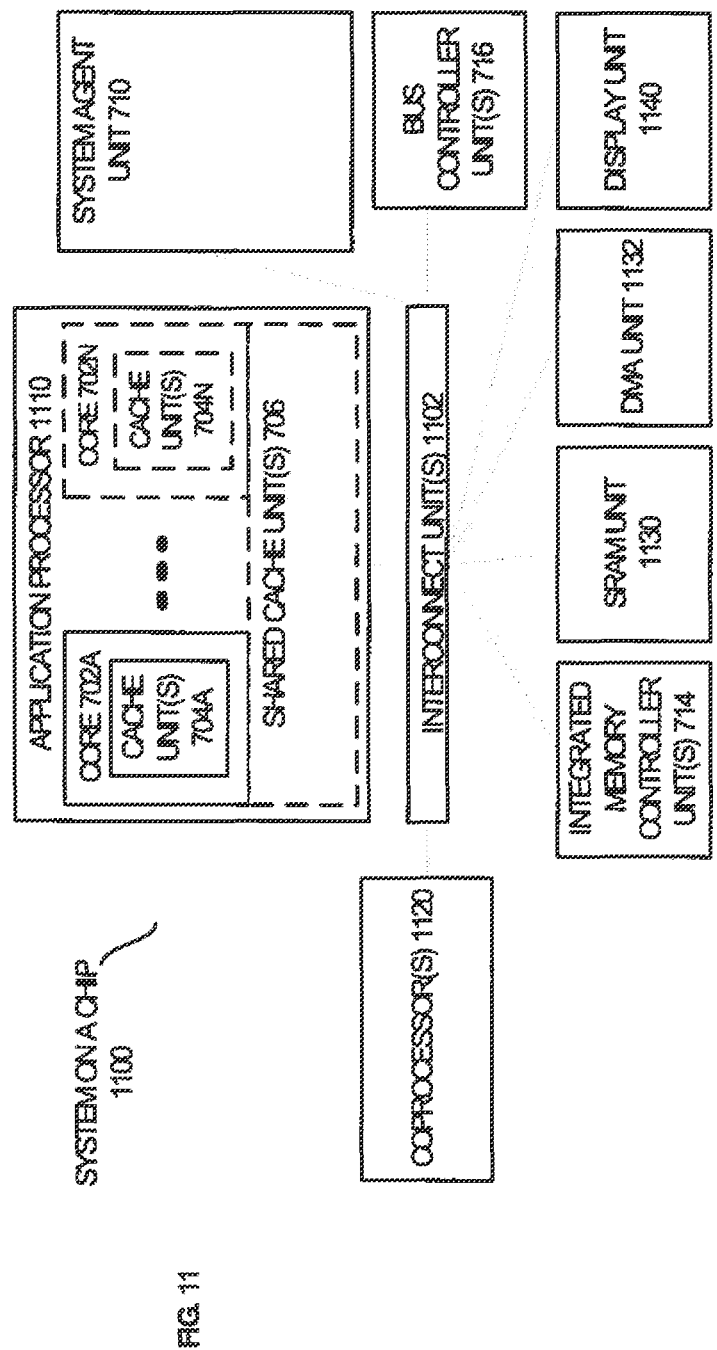
FIG. 11, shown is a block diagram of a system on a chip (SoC) in accordance with an embodiment of the present disclosure.

Referring now to FIG. 11, shown is a block diagram of a SoC 1100 in accordance with an embodiment of the present disclosure. Similar elements in FIG. 7 bear like reference numerals. Also, dashed lined boxes are optional features on more advanced SoCs. In FIG. 11, an interconnect unit(s) 1102 is coupled to: an application processor 1110 which includes a set of one or more cores 202A-N and shared cache unit(s) 706; a system agent unit 710; a bus controller unit(s) 716; an integrated memory controller unit(s) 714; a set or one or more coprocessors 1120 which may include integrated graphics logic, an image processor, an audio processor, and a video processor; an static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 12 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 12 shows a program in a high level language 1202 may be compiled using an x86 compiler 1204 to generate x86 binary code 1206 that may be natively executed by a processor with at least one x86 instruction set core 1216. The processor with at least one x86 instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1204 represents a compiler that is operable to generate x86 binary code 1206 (e.g., object code) that can, with or without additional linkage processing, be executed on the processor with at least one x86 instruction set core 1216. Similarly, FIG. 12 shows the program in the high level language 1202 may be compiled using an alternative instruction set compiler 1208 to generate alternative instruction set binary code 1210 that may be natively executed by a processor without at least one x86 instruction set core 1214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1212 is used to convert the x86 binary code 1206 into code that may be natively executed by the processor without an x86 instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have an x86 instruction set processor or core to execute the x86 binary code 1206.

What is claimed is:

1. A hardware apparatus comprising:
   a first processor core with a cache to store a cache line;
   a second set of processor cores that each include a cache to store a copy of the cache line; and
   cache coherence logic circuit to aggregate in a tag directory an acknowledgment message from each of the second set of processor cores in response to a request from the first processor core to modify the copy of the cache line in each of the second set of processor cores and send a consolidated acknowledgment message to the first processor core.

2. The hardware apparatus of claim 1, wherein the request from the first processor core is to update the copy of the cache line in the cache of each of the second set of processor cores.

3. The hardware apparatus of claim 1, wherein the request from the first processor core is to invalidate the copy of the cache line in the cache of each of the second set of processor cores.

4. The hardware apparatus of claim 1, wherein the tag directory comprises:
   a first tag directory of a domain that includes the cache of the first processor core and a second tag directory of a domain that includes the caches of the second set of processor cores, wherein the cache coherence logic circuit is to send the consolidated acknowledgment message from the second tag directory to the first processor core.

5. The hardware apparatus of claim 4, wherein a core valid vector of the second tag directory includes an element for each processor core of the second set of processor cores to indicate its cache includes the copy of the cache line.

6. The hardware apparatus of claim 4, wherein receipt of the request from the first processor core by the second tag directory is to set the second tag directory into an aggregator mode to allow the cache coherence logic circuit to aggregate the acknowledgment message from each of the second set of processor cores and to send the consolidated acknowledgment message from the second tag directory to the first processor core.

7. The hardware apparatus of claim 4, further comprising a second level tag directory of a domain that includes at least the first tag directory and the second tag directory, wherein the first tag directory and the second tag directory are first level tag directories, a request from the first processor core to modify all copies of the cache line is to be sent to the second level tag directory, and the second level tag directory is to send the request to all first level tag directories with copies of the cache line.

8. The hardware apparatus of claim 4, further comprising a second level tag directory of a domain that includes at least the first tag directory and the second tag directory, wherein the first tag directory and the second tag directory are first level tag directories, a request from the first processor core to modify all copies of the cache line is to be sent to the second level tag directory, the second level tag directory is to send the request to all first level tag directories in its domain that have copies of the cache line except the first tag directory, and an order marker is to be sent from the second level tag directory to the first processor core to provide a number of first level tag directories that are to send consolidated acknowledgment messages to the first processor core.

9. A method to control cache line coherence comprising:
   storing a cache line in a cache of a first processor core and a copy of the cache line in each respective cache of a second set of processor cores;
   aggregating in a tag directory an acknowledgment message from each of the second set of processor cores in response to a request from the first processor core to modify the copy of the cache line in each of the second set of processor cores; and sending a consolidated acknowledgment message to the first processor core.

10. The method of claim 9, wherein the request from the first processor core updates the copy of the cache line in the cache of each of the second set of processor cores.

11. The method of claim 9, wherein the request from the first processor core invalidates the copy of the cache line in the cache of each of the second set of processor cores.

12. The method of claim 9, further comprising providing a first tag directory of a domain that includes the cache of the first processor core and a second tag directory of a domain that includes the caches of the second set of processor cores, wherein the sending comprises sending the consolidated acknowledgment message from the second tag directory to the first processor core.

13. The method of claim 12, further comprising providing a core valid vector of the second tag directory that includes an element for each processor core of the second set of processor cores to indicate its cache includes the copy of the cache line.

14. The method of claim 12, further comprising setting the second tag directory into an aggregator mode on receipt of the request from the first processor core by the second tag directory to initiate the aggregation, wherein the sending comprises sending the consolidated acknowledgment message from the second tag directory to the first processor core.

15. The method of claim 12, further comprising a second level tag directory of a domain that includes at least the first tag directory and the second tag directory, wherein the first tag directory and the second tag directory are first level tag directories, a request from the first processor core to modify all copies of the cache line is sent to the second level tag directory, and the second level tag directory sends the request to all first level tag directories with copies of the cache line.

16. The method of claim 12, further comprising a second level tag directory of a domain that includes at least the first tag directory and the second tag directory, wherein the first tag directory and the second tag directory are first level tag directories, a request from the first processor core to modify all copies of the cache line is sent to the second level tag directory, the second level tag directory sends the request to all first level tag directories in its domain that have copies of the cache line except the first tag directory, and an order marker is sent from the second level tag directory to the first processor core to provide a number of first level tag directories that are to send consolidated acknowledgment messages to the first processor core.

17. An apparatus comprising:
a set of one or more processors; and
a set of one or more data storage devices that stores code, that when executed by the set of processors causes the set of one or more processors to perform the following:
storing a cache line in a cache of a first processor core and a copy of the cache line in each respective cache of a second set of processor cores;
aggregating in a tag directory an acknowledgment message from each of the second set of processor cores in response to a request from the first processor core to modify the copy of the cache line in each of the second set of processor cores; and
sending a consolidated acknowledgment message to the first processor core.

18. The apparatus of claim 17, wherein the set of data storage devices further stores code, that when executed by the set of processors causes the set of processors to perform the following:
wherein the request from the first processor core updates the copy of the cache line in the cache of each of the second set of processor cores.

19. The apparatus of claim 17, wherein the set of data storage devices further stores code, that when executed by the set of processors causes the set of processors to perform the following:
wherein the request from the first processor core invalidates the copy of the cache line in the cache of each of the second set of processor cores.

20. The apparatus of claim 17, wherein the set of data storage devices further stores code, that when executed by the set of processors causes the set of processors to perform the following:
further comprising providing a first tag directory of a domain that includes the cache of the first processor core and a second tag directory of a domain that includes the caches of the second set of processor cores, wherein the sending comprises sending the consolidated acknowledgment message from the second tag directory to the first processor core.

21. The apparatus of claim 20, wherein the set of data storage devices further stores code, that when executed by the set of processors causes the set of processors to perform the following:
further comprising providing a core valid vector of the second tag directory that includes an element for each processor core of the second set of processor cores to indicate its cache includes the copy of the cache line.

22. The apparatus of claim 20, wherein the set of data storage devices further stores code, that when executed by the set of processors causes the set of processors to perform the following:
further comprising setting the second tag directory into an aggregator mode on receipt of the request from the first processor core by the second tag directory to initiate the aggregation, wherein the sending comprises sending the consolidated acknowledgment message from the second tag directory to the first processor core.

23. The apparatus of claim 20, wherein the set of data storage devices further stores code, that when executed by the set of processors causes the set of processors to perform the following:
further comprising a second level tag directory of a domain that includes at least the first tag directory and the second tag directory, wherein the first tag directory and the second tag directory are first level tag directories, a request from the first processor core to modify all copies of the cache line is sent to the second level tag directory, and the second level tag directory sends the request to all first level tag directories with copies of the cache line.

24. The apparatus of claim 20, wherein the set of data storage devices further stores code, that when executed by the set of processors causes the set of processors to perform the following:
further comprising a second level tag directory of a domain that includes at least the first tag directory and the second tag directory, wherein the first tag directory and the second tag directory are first level tag directories, a request from the first processor core to modify all copies of the cache line is sent to the second level tag directory, the second level tag directory sends the request to all first level tag directories in its domain that have copies of the cache line except the first tag directory, and an order marker is sent from the second level tag directory to the first processor core to provide a number of first level tag directories that are to send consolidated acknowledgment messages to the first processor core.

* * * * *